United States Patent
Terashima

(10) Patent No.: US 8,045,842 B2
(45) Date of Patent: Oct. 25, 2011

(54) INFORMATION PROCESSING APPARATUS AND METHOD, TRANSMISSION APPARATUS AND METHOD, RECORDING APPARATUS AND METHOD AND PROGRAM

(75) Inventor: Masayuki Terashima, Kanagawa (JP)

(73) Assignee: Sony Corporation, Tokyo (JP)

( * ) Notice: Subject to any disclaimer, the term of this patent is extended or adjusted under 35 U.S.C. 154(b) by 1448 days.

(21) Appl. No.: 11/517,615

(22) Filed: Sep. 7, 2006

(65) Prior Publication Data

US 2007/0058950 A1 Mar. 15, 2007

(30) Foreign Application Priority Data

Sep. 8, 2005 (JP) .................. 2005-260176

(51) Int. Cl.
*H04N 5/92* (2006.01)
*H04N 5/917* (2006.01)
*H04N 5/83* (2006.01)
*H04N 5/89* (2006.01)

(52) U.S. Cl. ........ 386/326; 386/327; 386/328; 386/329; 386/330; 386/331; 386/332; 386/335; 386/336

(58) Field of Classification Search ............... 386/46, 386/83, 95, 123–126, 326, 327, 328, 329, 386/330, 331, 332, 334, 335, 336
See application file for complete search history.

(56) References Cited

U.S. PATENT DOCUMENTS

| 5,485,279 | A * | 1/1996 | Yonemitsu et al. | 375/240.14 |
| 7,660,510 | B2 * | 2/2010 | Kawahara et al. | 386/281 |
| 2003/0128970 | A1 * | 7/2003 | Lan et al. | 386/112 |
| 2004/0148551 | A1 | 7/2004 | Kawahara | |
| 2005/0084241 | A1 * | 4/2005 | Ishibashi et al. | 386/83 |

FOREIGN PATENT DOCUMENTS

| JP | 9 34872 | 2/1997 |
| WO | WO 02/054762 | 7/2002 |

* cited by examiner

*Primary Examiner* — Thai Tran
*Assistant Examiner* — Daquan Zhao
(74) *Attorney, Agent, or Firm* — Frommer Lawrence & Haug LLP; William S. Frommer; Ellen Marcie Emas

(57) ABSTRACT

An information processing apparatus includes a conversion section configured to convert one of an SD signal according to a predetermined standard of Standard Definition Television and an HD signal according to a predetermined standard of High-Definition Television into the other one of the signals and output the resulting signal in a predetermined format.

18 Claims, 23 Drawing Sheets

F I G . 6
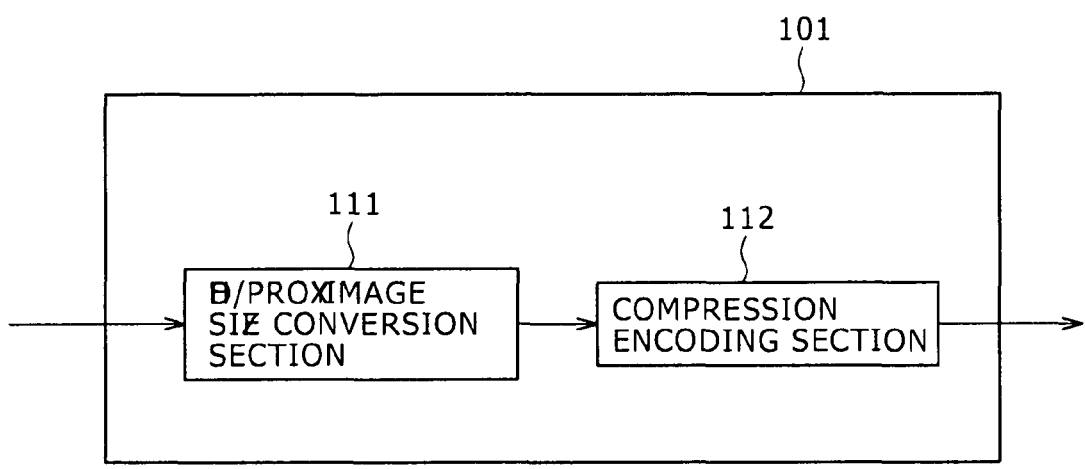

F I G . 7
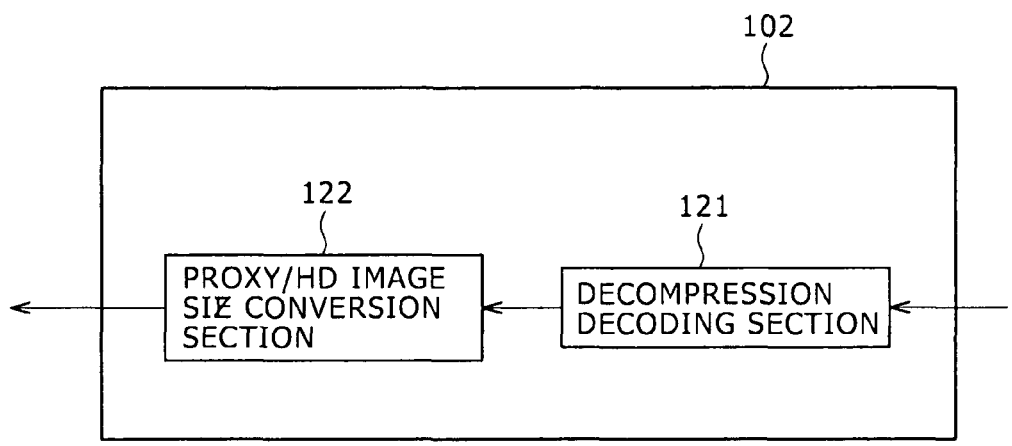

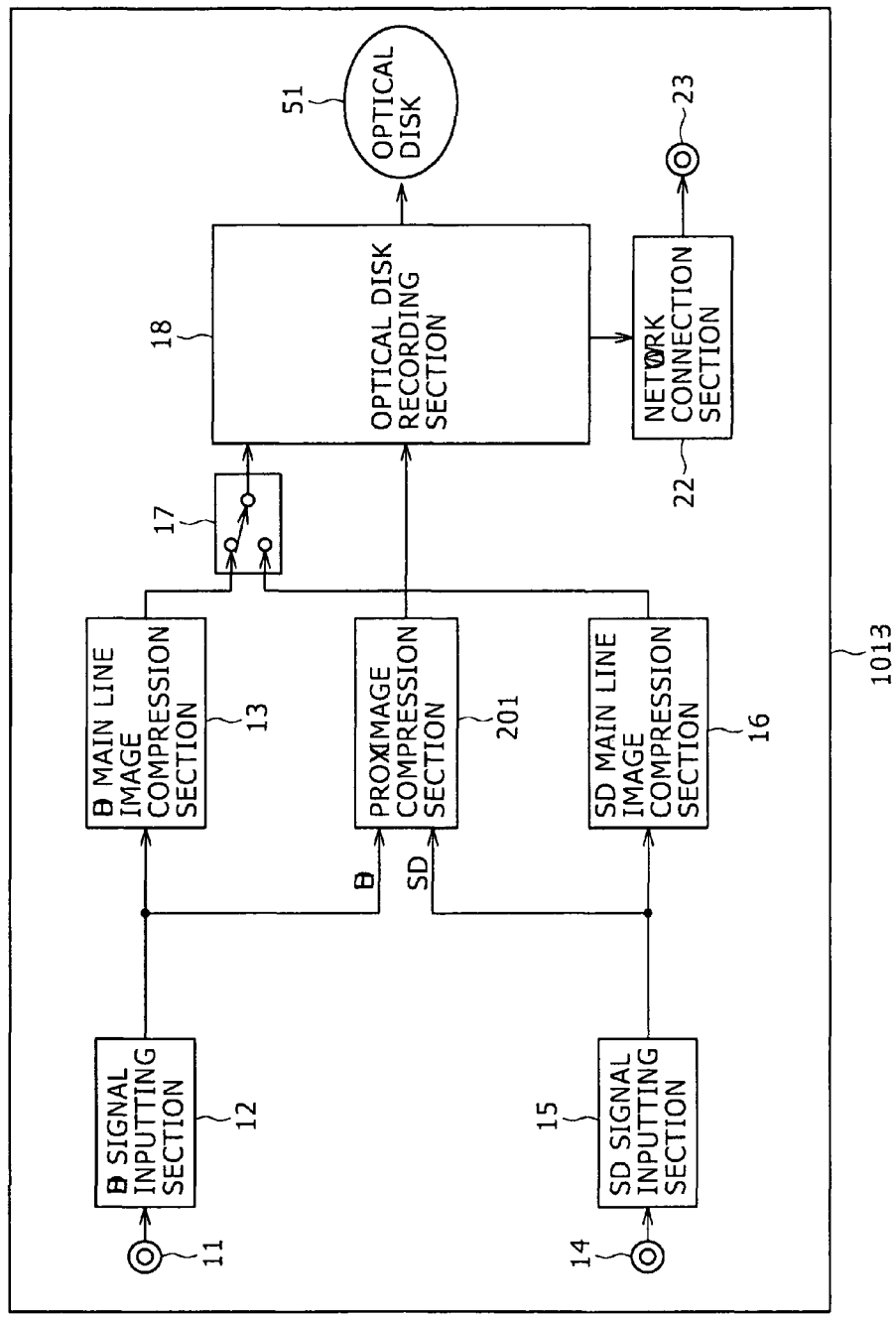

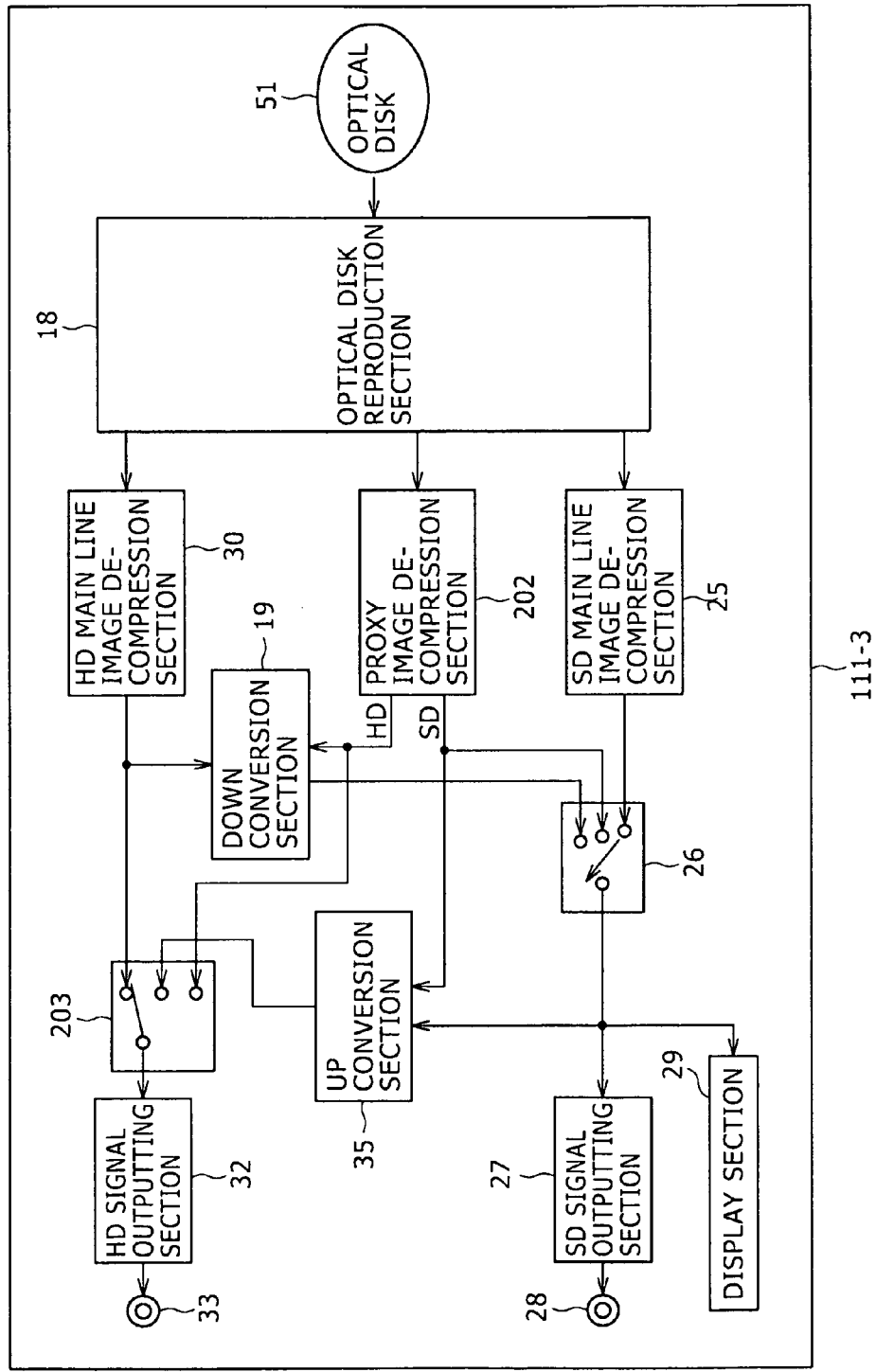

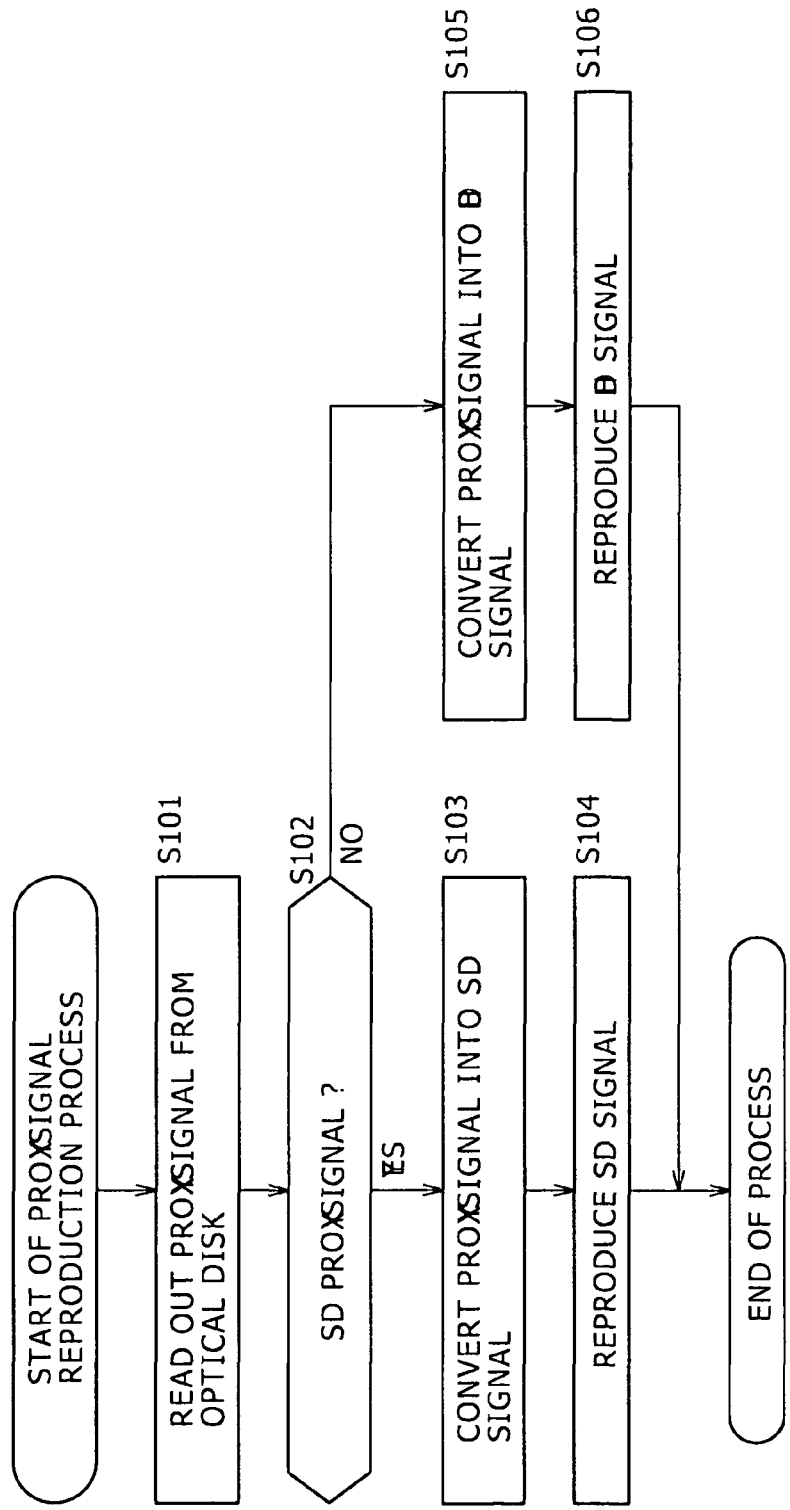

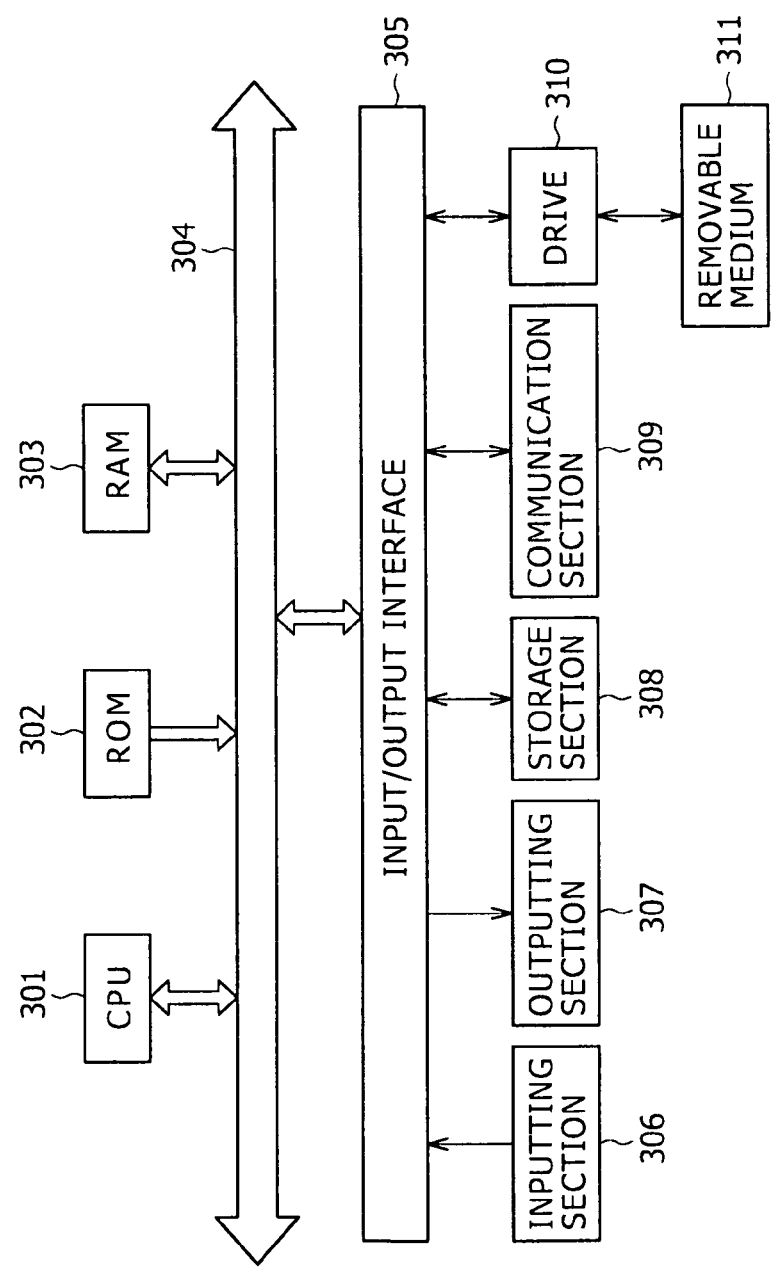

INFORMATION PROCESSING APPARATUS AND METHOD, TRANSMISSION APPARATUS AND METHOD, RECORDING APPARATUS AND METHOD AND PROGRAM

CROSS REFERENCES TO RELATED APPLICATIONS

The present invention contains subject matter related to Japanese Patent Application JP 2005-260176 filed with the Japanese Patent Office on Sep. 8, 2005, the entire contents of which being incorporated herein by reference.

BACKGROUND OF THE INVENTION

1. Field of the Invention

This invention relates to an information processing apparatus and method, a transmission apparatus and method, a recording apparatus and method, and a program. More particularly, the present invention relates to an information processing apparatus and method, a transmission apparatus and method, a recording apparatus and method and a program wherein an SD Proxy signal and an HD Proxy signal are handled in a common format with a suppressed circuit scale.

2. Description of the Related Art

Optical disk recording and reproduction apparatus used in broadcasting stations and so forth in recent years handle a baseband signal complying with a standard of the related art as an original signal of a content obtained by image pickup. The standard of the related art is a standard of Standard Definition Television such as the NTSC (National Television System Committee) system against a standard of High-Definition Television which has appeared in recent years. It is to be noted that such a baseband signal as mentioned above is hereinafter referred to as SD signal.

In this instance, an optical disk of the related art recording and reproduction apparatus can compression encode an SD signal which is an original signal of a content, for example, in accordance with an MPEG (Moving Picture Experts Group) system and record a signal obtained as a result of the compression encoding on an optical disk. Such a signal obtained as a result of compression encoding as just mentioned is hereinafter referred to as SD main line image signal. Further, the optical disk recording and reproduction apparatus of the related art can reproduce an SD main line image signal recorded on an optical disk, that is, read out and decompression decode the SD main line image signal, and output an SD signal obtained as a result of the decompression decoding.

Further, some optical disk recording and reproduction apparatus of the related art can handle, as an object of recording and reproduction on and from an optical disk, not only an SD main line image signal of a predetermined content but also a Proxy signal regarding the predetermined content. One of such optical disk recording and reproduction apparatus is disclosed, for example, in U.S. Published Application No. 2004/0148551.

The Proxy signal is a generic term of signals which are utilized as a representative of an SD main line image signal when editing of a content is performed and are produced so that, for example, simple and easy editing can be performed.

For example, a signal produced so as to have a reduced image size when compared with an SD main line image signal is a type of a Proxy signal. A Proxy signal of this type has a characteristic that it has a smaller data amount when compared with an SD main line image signal and allows simple and easy editing due to this characteristic. It is to be noted that a Proxy signal of the type described is hereinafter referred to as image size reduction type Proxy signal.

A signal obtained as a result of an encoding process performed for an SD signal in a unit of a GOP (Group Of Picture) is an SD main line image signal, and also a signal obtained as a result of an encoding process performed for an SD signal in a unit of a frame is a type of a Proxy signal. The encoding process in a unit of a frame here is a process of encoding, for all frames which form an SD signal, a frame making use of the frame itself, that is, a process of encoding each frame without making use of any other frame such as a preceding or succeeding frame. The encoding process in a unit of a frame here is sometimes referred to as intra-frame compression. Accordingly, where an SD main line image signal is handled, in order to decode a P picture or a B picture other than an I picture, another frame included in a corresponding GOP is essentially required. In contrast, a Proxy signal obtained by intra-frame compression has a characteristic that any frame thereof can be decoded with the frame itself similarly to an I picture, that is, the Proxy signal can be decoded in a unit of a frame. The Proxy signal of the type described allows simple and easy editing due to the characteristic just described. It is to be noted that the Proxy signal of the type described is hereinafter referred to as intra compression type Proxy signal.

Further, in recent years, the tendency to try to record and reproduce also a baseband signal complying with the standard of High-Definition Television described hereinabove as an original signal of a content obtained by image pickup on and from an optical disk has become intensified. It is to be noted that such a baseband signal as mentioned above is hereinafter referred to as HD signal.

As a result, a demand to utilize an HD Proxy signal in addition to a popular SD Proxy signal has been and is increasing in recent years.

SUMMARY OF THE INVENTION

However, a currently available technique which satisfies the demand mentioned above is to newly incorporate a block such as a circuit which handles an HD Proxy signal separately from a block such as a circuit which handles an SD Proxy signal in an optical disk recording and reproduction apparatus of the related art. The technique just described involves a problem that the circuit scale of the optical disk recording and reproduction apparatus increases or that the format of an HD Proxy signal and the format of an SD Proxy signal are different from each other.

Therefore, it is desirable to provide an information processing apparatus and method, a transmission apparatus and method, a recording apparatus and method and a program wherein an SD Proxy signal and an HD Proxy signal can be handled in a common format with a suppressed circuit scale.

According to an embodiment of the present invention, there is provided an information processing apparatus including a conversion section configured to convert one of an SD signal according to a predetermined standard of Standard Definition Television and an HD signal according to a predetermined standard of High-Definition Television into the other one of the signals and output the resulting signal in a predetermined format.

The conversion section may include a down conversion section, an image size variation section, and a compression encoding section. The down conversion section is configured to perform a down conversion process for the HD signal inputted thereto and output an SD signal obtained by the down conversion process. The image size variation section is configured to perform an image size variation process for the inputted SD signal or the SD signal outputted from the down conversion section and output an image size variation signal obtained as a result of the image size variation process. The compression encoding section is configured to perform a compression encoding process for the image size variation signal outputted from the image size variation section and output a signal obtained as a result of the compression encoding process as a signal of the predetermined format.

As an alternative, the conversion section may include an up conversion section, an image size variation section, and a compression encoding section. The up conversion section is configured to perform an up conversion process for the SD signal inputted thereto and output an HD signal obtained as a result of the up conversion process. The image size variation section is configured to perform an image size variation process for the HD signal inputted thereto or the HD signal outputted from the up conversion section and output an image size variation signal obtained as a result of the image size variation process. The compression encoding section is configured to perform a compression encoding process for the image size variation signal outputted from the image size variation section and output a signal obtained as a result of the compression encoding process as a signal of the predetermined format.

As another alternative, the conversion section may include a first image size variation section, a second image size variation section, and a compression encoding section. The first image size variation section is configured to perform, for the inputted SD signal of a first image size, a process for varying the image size from the first image size to a second image size and output an image size variation signal of the second image size obtained as a result of the process. The second image size variation section is configured to perform, for the inputted HD signal of a third size, a process for changing the image size from the third image size to the second image size and output an image size variation signal of the second image size obtained as a result of the process. The compression encoding section is configured to perform a compression encoding process for the image size variation signal outputted from the first or second image size variation section and output a signal obtained as a result of the compression encoding process as a signal of the predetermined format.

According to another embodiment, there is provided an information processing method including a step of converting one of an SD signal according to a predetermined standard of Standard Definition Television and an HD signal according to a predetermined standard of High-Definition Television into the other one of the signals and output the resulting signal in a predetermined format.

According to a further embodiment of the present invention, there is provided an information processing apparatus including an inverse conversion section configured to inversely convert, when a signal of a predetermined format obtained by conversion from one of an SD signal according to a predetermined standard of Standard Definition Television and an HD signal according to a predetermined standard of High-Definition Television into the other one of the signals is inputted, the signal of the predetermined format into the one of the SD signal and the HD signal.

The information processing apparatus may be configured such that the signal of the predetermined format is a signal obtained by performing, for the SD signal of a first image size or an SD signal of the first image size obtained by a down conversion process performed for the HD signal, a process for varying the image size from the first image size to a second image size and then performing a compression encoding process for an image size variation signal of the second image size obtained by the variation process. In the apparatus described above, the inverse conversion section includes a decompression decoding section, an image size inverse conversion section, and an up conversion section. The decompression decoding section is configured to perform a decompression decoding process for the signal of the predetermined format and output the image size variation signal obtained as a result of the decompression decoding process. The image size inverse conversion section is configured to perform a process for inversely varying the image size of the image size variation signal outputted from the decompression decoding section from the second image size to the first image size and output an SD signal obtained as a result of the process. The up conversion section is configured to perform, where the SD signal outputted from the image size inverse conversion section corresponds to the SD signal obtained as a result of the down conversion process performed for the HD signal, an up conversion process for the SD signal outputted from the image size inverse conversion section and output an HD signal obtained as a result of the up conversion process.

As an alternative, the information processing apparatus may be configured such that the signal of the predetermined format is a signal obtained by performing, for the HD signal of a first image size or an HD signal of the first image size obtained by an up conversion process performed for the SD signal, a process for varying the image size from the first image size to a second image size and then performing a compression encoding process for an image size variation signal of the second image size obtained as a result of the variation process. In the apparatus, the inverse conversion section includes a decompression decoding section, an image size inverse conversion section, and a down conversion section. The decompression decoding section is configured to perform a decompression decoding process for the signal of the predetermined format and output the image size variation signal obtained as a result of the decompression decoding process. The image size inverse conversion section is configured to perform, for the image size variation signal outputted from the decompression decoding section, a process for inversely varying the image size from the second image size to the first image size and output an HD signal obtained as a result of the process. The down conversion section is configured to perform, where the HD signal outputted from the image size inverse conversion section corresponds to the HD signal obtained by the up conversion process performed for the SD signal, a down conversion process for the HD signal outputted from the image size inverse conversion section and output an SD signal obtained as a result of the down conversion process.

As another alternative, the information processing apparatus may be configured such that the signal of the predetermined format is a signal obtained by performing a compression encoding process for an image size variation signal of a second image size obtained by performing, for the SD signal of the first image size, a process for varying the image size from the first image size to the second image size or another image size variation signal of the second image size obtained by performing, for the HD signal of a third image size, a process for varying the image size from the third image size to the second image size. In the apparatus, the inverse conversion section includes a decompression decoding section, a first image size inverse variation section, and a second image size inverse variation section. The decompression decoding section is configured to perform a decompression decoding process for the signal of the predetermined format and output the image size variation signal obtained as a result of the decompression decoding process. The first image size inverse variation section is configured to perform, where the image size variation signal outputted from the decompression decoding section corresponds to the image size variation signal obtained by the variation from the SD signal, a process for inversely varying the image size from the second image size to the first image size for the image size variation signal outputted from the decompression decoding section and output an SD signal obtained as a result of the process. The second image size inverse variation section is configured to perform, where the image size variation signal outputted from the decompression decoding section corresponds to the image size variation signal obtained by the variation from the HD signal, a process for inversely varying the image size from the second image size to the third image size for the image size variation signal outputted from the decompression decoding section and output an HD signal obtained as a result of the process.

According to a still further embodiment of the present invention, there is provided an information processing method including a step of inversely converting, when a signal of a predetermined format obtained by conversion from one of an SD signal according to a predetermined standard of Standard Definition Television and an HD signal according to a predetermined standard of High-Definition Television into the other one of the signals is inputted, the signal of the predetermined format into the one of the SD signal and the HD signal.

According to a yet further embodiment of the present invention, there is provided a transmission apparatus including a conversion section configured to convert one of an SD signal according to a predetermined standard of Standard Definition Television and an HD signal according to a predetermined standard of High-Definition Television into the other one of the signals and output the resulting signal in a predetermined format, and a transmission section configured to transmit the signal of the predetermined format outputted from the conversion section.

According to a yet further embodiment of the present invention, there is provided a transmission method for a transmission apparatus for transmitting a signal, comprising the steps of converting one of an SD signal according to a predetermined standard of Standard Definition Television and an HD signal according to a predetermined format of High-Definition Television into the other one of the signals in a predetermined format, and controlling transmission of the signal of the predetermined format from the transmission apparatus.

According to a yet further embodiment of the present invention, there is provided a recording apparatus including a conversion section configured to convert one of an SD signal according to a predetermined standard of Standard Definition Television and an HD signal according to a predetermined standard of High-Definition Television into a signal of a predetermined format and output the signal of the predetermined format, and a recording control section configured to perform a control process to record the signal of the predetermined format outputted from the conversion section on a predetermined recording medium.

The recording apparatus may be configured such that it further includes an SD compression encoding section configured to perform a compression encoding process for the SD signal and output a compression encoded SD signal obtained as a result of the compression encoding process, and the recording control section performs a control process to record the compression encoded SD signal outputted from the SD compression encoding section on the predetermined recording medium together with the signal of the predetermined format obtained by the conversion from the SD signal by the conversion section.

Alternatively, the recording apparatus may be configured such that it further includes an HD compression encoding section configured to perform a compression encoding process for the HD signal and output the compression encoded HD signal obtained as a result of the compression encoding process, and the recording controlling section performs a control process to record the compression encoded HD signal outputted from the HD compression encoding section on the predetermined recording medium together with the signal of the predetermined format obtained by the conversion from the HD signal by the conversion section.

According to a yet further embodiment of the present invention, there is provided a recording method for a recording apparatus for recording a signal on a predetermined recording medium, including the steps of converting one of an SD signal according to a predetermined standard of Standard Definition Television and an HD signal according to a predetermined standard of High-Definition Television into a signal of a predetermined format, and performing a control process to record the signal of the predetermined format on the predetermined recording medium.

With the information processing apparatus and method, transmission apparatus and method and recording apparatus and method, a signal of the predetermined format can be handled, for example, as a Proxy signal. Particularly, an SD Proxy signal and an HD Proxy signal can be handled in a common format, and also the circuit scale can be suppressed.

The above and other needs, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 6 is a block diagram showing an example of a detailed configuration of a Proxy image compression section of the optical disk recording and reproduction apparatus of FIG. 5;

FIG. 7 is a block diagram showing an example of a detailed configuration of a Proxy image decompression section of the optical disk recording and reproduction apparatus of FIG. 5;

FIG. 20 is a block diagram showing a further example of a configuration of an optical disk recording apparatus to which the present invention is applied;

FIG. 21 is a block diagram showing a further example of a configuration of an optical disk reproduction apparatus to which the present invention is applied;

FIG. 22 is a flow chart illustrating an example of a Proxy signal reproduction process of the optical disk reproduction apparatus of FIG. 21 or the optical disk recording and reproduction apparatus of FIG. 11; and FIG. 23 is a block diagram showing an example of a configuration of a personal computer which executes a program to which the present invention is applied.

DETAILED DESCRIPTION OF THE PREFERRED EMBODIMENTS

Figure 1:
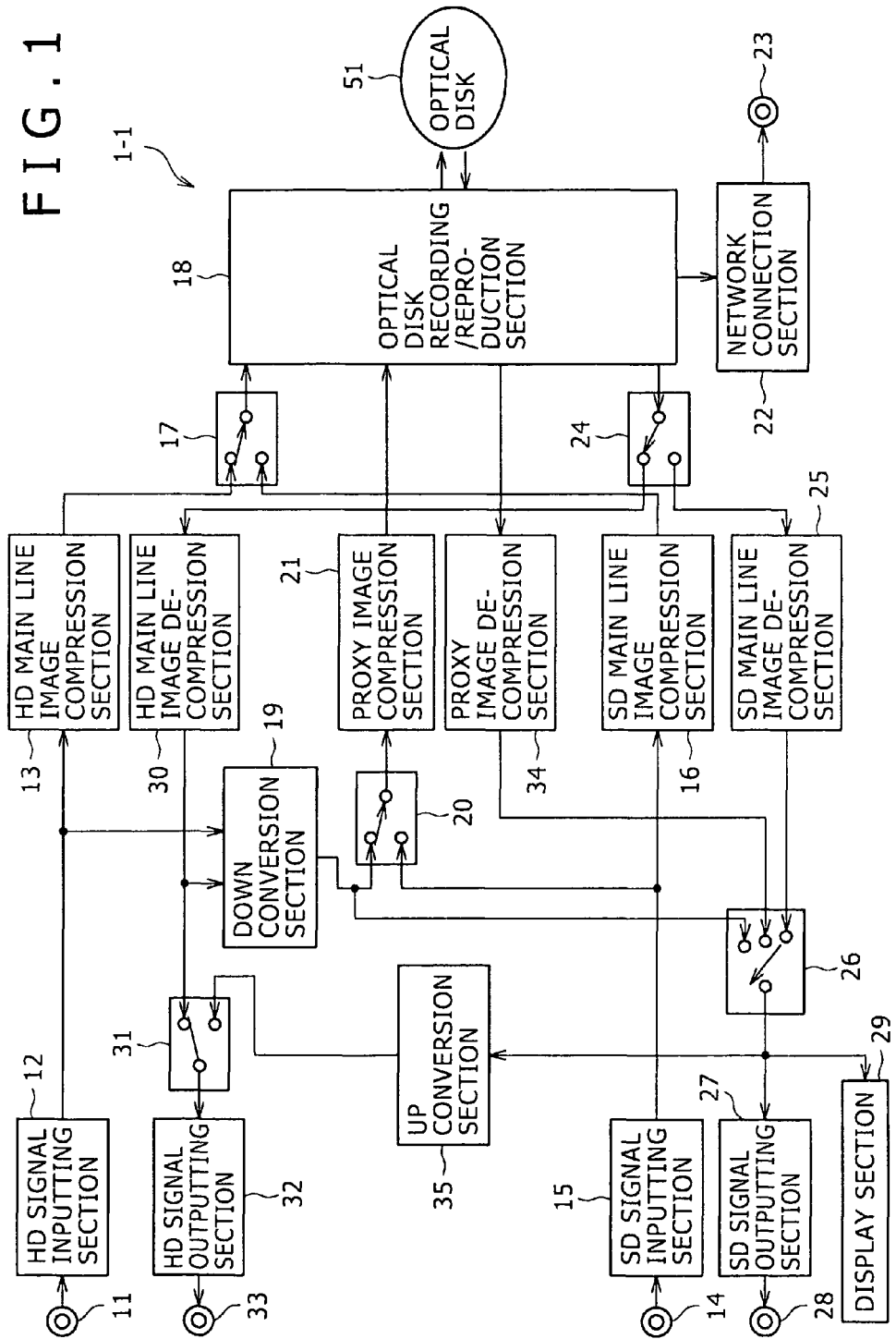
FIG. 1 is a block diagram showing an example of a configuration of an optical disk recording and reproduction apparatus to which the present invention is applied.

Preferred embodiments of the present invention will be hereinafter described referring to the drawings.

FIG. 1 shows an example of a configuration of an optical disk recording and reproduction apparatus to which the present invention is applied.

Referring to FIG. 1, the optical disk recording and reproduction apparatus 1-1 shown has terminals 11, 14, 23, 28 and 33. The optical disk recording and reproduction apparatus 1-1 includes an HD signal inputting section 12, an HD main line image compression section 13, an SD signal inputting section 15, an SD main line image compression section 16, and a changeover section 17. The optical disk recording and reproduction apparatus 1-1 further includes an optical disk recording/reproduction section 18, a down conversion section 19, another changeover section 20, a Proxy image compression section 21, and a network connection section 22. The optical disk recording and reproduction apparatus 1-1 further includes a further changeover section 24, an SD main line image decompression section 25, a still further changeover section 26, an SD signal outputting section 27, and a display section 29. The optical disk recording and reproduction apparatus 1-1 further includes an HD main line image decompression section 30, a yet further changeover section 31, an HD signal outputting section 32, a Proxy image decompression section 34, and an up conversion section 35.

The HD signal inputting section 12 receives an HD signal supplied thereto from the outside as an input thereto through the terminal 11 and provides the received HD signal to the HD main line image compression section 13 and the down conversion section 19.

The HD main line image compression section 13 compression encodes the HD signal supplied thereto in accordance with the MPEG system and provides an elementary stream obtained as a result of the compression encoding as an HD main line image signal to the changeover section 17. The elementary stream obtained as a result of the compression encoding is hereinafter referred to as ES signal.

Meanwhile, the SD signal inputting section 15 receives an SD signal supplied thereto as an input thereto from the outside through the terminal 14 and provides the received SD signal to the SD main line image compression section 16 and the changeover section 20.

The SD main line image compression section 16 compression encodes the SD signal supplied thereto in accordance with the MPEG system and provides an ES signal obtained as a result of the compression encoding as an SD main line image signal to the changeover section 17.

The changeover section 17 changes over the input thereof between the HD main line image compression section 13 side and the SD main line image compression section 16 side under the control of a control section or the like not shown.

In particular, where the input to the changeover section 17 is changed over to the HD main line image compression section 13 side, an HD main line image signal outputted from the HD main line image compression section 13 is inputted to the changeover section 17 and provided to the optical disk recording/reproduction section 18.

On the other hand, where the input to the changeover section 17 is changed over to the SD main line image compression section 16 side, an SD main line image signal outputted from the SD main line image compression section 16 is inputted to the changeover section 17 and provided to the optical disk recording/reproduction section 18.

The optical disk recording/reproduction section 18 records or writes an HD main line image signal or an SD main line image signal supplied thereto from the changeover section 17 on an optical disk 51. Further, the optical disk recording/reproduction section 18 records a Proxy signal provided thereto from the Proxy image compression section 21 hereinafter described on the optical disk 51.

Further, the optical disk recording/reproduction section 18 reads out an HD main line image signal or an SD main line image signal recorded on the optical disk 51 as occasion demands and provides the read out image signal to the changeover section 24. Furthermore, the optical disk recording/reproduction section 18 reads out a Proxy signal recorded on the optical disk 51 as occasion demands and provides the read out Proxy signal to the Proxy image decompression section 34.

The down conversion section 19 performs a down conversion process for an HD signal provided thereto from the HD signal inputting section 12 described hereinabove or the HD main line image decompression section 30 hereinafter described. The down conversion section 19 provides an SD signal obtained by the down conversion process to the changeover sections 20 and 26. Although details are hereinafter described, the reason why an SD signal down converted from an HD signal is provided to the changeover section 20 is that it is intended to allow the Proxy image compression section 21 to produce an HD Proxy signal from the SD signal. Meanwhile, the reason why an SD signal is provided to the changeover section 26 is that mainly, it is intended to cause the display section 29 to display an image corresponding to the SD signal.

The changeover section 20 changes over the input thereof between the SD signal inputting section 15 side and the down conversion section 19 side under the control of the control section or the like not shown.

In particular, where the input of the changeover section 20 is changed over to the SD signal inputting section 15 side, an SD signal which is an output signal of the SD signal inputting section 15 is provided to the Proxy image compression section 21 through the changeover section 20. In this instance, an SD Proxy signal is produced by the Proxy image compression section 21 as hereinafter described.

On the other hand, where the input of the changeover section 20 is changed over to the down conversion section 19 side, an SD signal which is an output signal of the down conversion section 19, that is, an SD signal down converted from an HD signal, is inputted to the changeover section 20. Consequently, the SD signal is provided to the Proxy image compression section 21. In this instance, an HD Proxy signal is produced by the Proxy image compression section 21 as hereinafter described.

The Proxy image compression section 21 performs a process of converting an SD signal provided thereto from the changeover section 20 into a Proxy signal and provides the resulting Proxy signal to the optical disk recording/reproduction section 18.

As described hereinabove, Proxy signals are divided into various types such as an image size reduction type Proxy signal and an intra compression type Proxy signal. Therefore, the process of conversion into a Proxy signal by the Proxy image compression section 21 differs depending upon the type of a Proxy signal after the conversion. Therefore, for the simplification of description, it is assumed that an image size reduction type Proxy signal is adopted.

In particular, the Proxy image compression section 21 performs a process of converting an SD signal into an image size reduction type Proxy signal and provides the resulting image size reduction type Proxy signal to the optical disk recording/reproduction section 18.

The Proxy image compression section 21 can execute such a process of converting an SD signal into an image size reduction type Proxy signal as described above. To this end, the Proxy image compression section 21 may be formed, for example, from an SD/Proxy image size conversion section 71 and a compression encoding section 72 as seen in FIG. 2.

Figure 2:
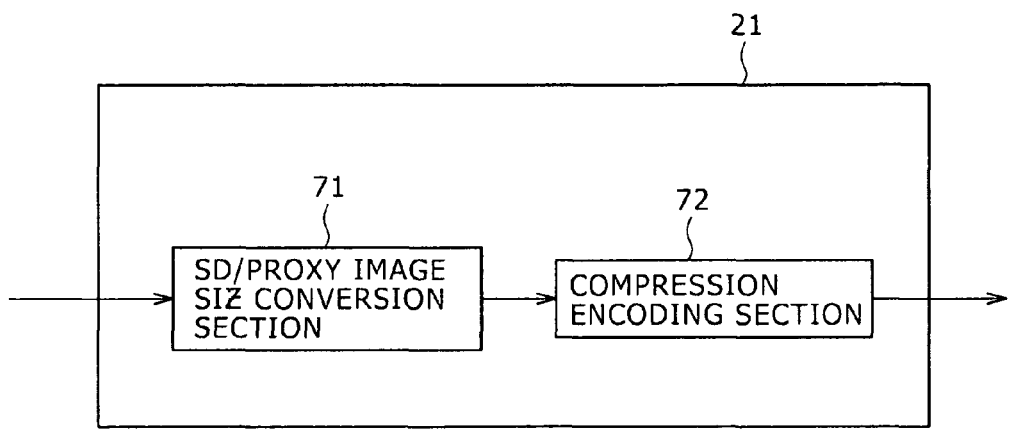
FIG. 2 is a block diagram showing an example of a detailed configuration of a Proxy image compression section of the optical disk recording and reproduction apparatus of FIG. 1.

Referring to FIG. 2, the SD/Proxy image size conversion section 71 performs a process of reducing the image size for an SD signal supplied thereto from the changeover section 20 shown in FIG. 1. Particularly, for example, a process of reducing the image size of 720 pixels×480 effective lines into another image size of horizontally 352 pixels×vertically 240 pixels is executed. The SD/Proxy image size conversion section 71 provides a baseband signal obtained as a result of the process to the compression encoding section 72. Such a baseband signal as just mentioned is hereinafter referred to as image size reduction signal.

The compression encoding section 72 compression encodes an image size reduction signal provided thereto from the SD/Proxy image size conversion section 71, for example, in accordance with the MPEG system. Then, the compression encoding section 72 provides an ES signal obtained as a result of the compression encoding as a Proxy signal, or more precisely as an image size reduction type Proxy signal, to the optical disk recording/reproduction section 18 shown in FIG. 1.

Referring back to FIG. 1, the down conversion section 19 performs a down conversion process for an HD signal inputted to the HD signal inputting section 12. If an SD signal obtained as a result of the down conversion process by the down conversion section 19 is inputted to the Proxy image compression section 21, then an HD Proxy signal is outputted from the Proxy image compression section 21.

On the other hand, if an SD signal inputted to the SD signal inputting section 15 is inputted to the Proxy image compression section 21 through the changeover section 20, then an SD Proxy signal is outputted from the Proxy image compression section 21.

In this manner, even where an HD Proxy signal is to be produced, an HD signal is converted into an SD signal and then provided to the Proxy image compression section 21. In other words, the HD signal is provided in the form of an SD signal to the Proxy image compression section 21 similarly as in the case wherein an SD Proxy signal is to be produced. Consequently, the Proxy image compression section 21 can produce an HD Proxy signal in the same format as that of an SD Proxy signal.

The network connection section 22 establishes a connection to a predetermined network not shown through the terminal 23 to execute a transmission/reception process to and from a different apparatus not shown on the network. For example, the network connection section 22 can transmit various signals read out from the optical disk 51 by the optical disk recording/reproduction section 18, for example, to an editing apparatus 251 or a broadcasting station 252 hereinafter described with reference to FIG. 13 through the network.

Upon such transmission, the network connection section 22 can directly transmit an SD main line image signal or an HD main line image signal to the different apparatus on the network. However, since the amount of data, particularly the amount of data of the HD main line image signal, is great, a long period of time is demanded for the transmission. Therefore, in order to solve the problem just described, the network connection section 22 transmits an image size reduction type Proxy signal, whose data amount is smaller, to the different apparatus on the network.

Further, since the SD main line image signal, HD main line image signal and Proxy signals are ES signals, the network connection section 22 converts any of the ES signals, for example, into a transport stream signal prescribed in the IEEE (The Institute of Electrical and Electronics Engineers, Inc.) 1394. Such a transport stream signal as just mentioned is hereinafter referred to as TS signal. The network connection section 22 can thus transmit any of the ES signals as a TS signal to the different apparatus on the network through the terminal 23.

The changeover section 24 changes over the output thereof between the SD main line image decompression section 25 side and the HD main line image decompression section 30 side under the control of the control section or the like not shown.

In particular, where the output of the changeover section 24 is changed over to the SD main line image decompression section 25 side, an SD main line image signal read out from the optical disk 51 by the optical disk recording/reproduction section 18 is inputted to the changeover section 24 and provided to the SD main line image decompression section 25.

On the other hand, where the output of the changeover section 24 is changed over to the HD main line image decompression section 30 side, an HD main line image signal read out from the optical disk 51 by the optical disk recording/reproduction section 18 is inputted to the changeover section 24 and provided to the HD main line image decompression section 30.

The SD main line image decompression section 25 decompression decodes an SD main line image signal as an ES signal supplied thereto from the changeover section 24 in accordance with the MPEG system and provides an SD signal obtained as a result of the decompression decoding to the changeover section 26.

The changeover section 26 changes over the input thereof among the SD main line image decompression section 25 side, Proxy image decompression section 34 side and down conversion section 19 side under the control of the control section or the like not shown.

In particular, where the input of the changeover section 26 is changed over to the SD main line image decompression section 25 side, an SD signal outputted from the SD main line image decompression section 25, that is, an SD signal converted from an SD main line image signal as described hereinabove is inputted to the changeover section 26. Consequently, the SD signal is provided to the SD signal outputting section 27, display section 29 and up conversion section 35.

On the other hand, where the input of the changeover section 26 is changed over to the Proxy image decompression section 34 side, an SD signal outputted from the Proxy image decompression section 34, that is, an SD signal converted from a Proxy signal as hereinafter described, is inputted to the changeover section 26. Consequently, the SD signal is provided to the SD signal outputting section 27, display section 29 and up conversion section 35.

It is to be noted that, generally where a shuttle reproduction or fast feed reproduction function or a thumbnail function is utilized, the input of the changeover section 26 is changed over to the Proxy image decompression section 34 side. In particular, in order to implement the shuttle reproduction or fast feed reproduction function or the thumbnail function, an SD Proxy signal or a corresponding SD signal is utilized in place of an SD main line image signal or a corresponding SD signal.

On the other hand, where the input of the changeover section 26 is changed over to the down conversion section 19 side, an SD signal outputted from the down conversion section 19, that is, an SD signal obtained by a down conversion process by the down conversion section 19 for an HD signal inputted from the outside or an HD signal converted from an HD main line imager signal as hereinafter described, is inputted to the changeover section 26. Then, the SD signal is provided from the changeover section 26 to the SD signal outputting section 27, display section 29 and up conversion section 35.

The SD signal outputting section 27 outputs an SD signal provided thereto from the changeover section 26 to the outside through the terminal 28.

The display section 29 displays an image corresponding to an SD signal provided thereto from the changeover section 26. It is to be noted here that an SD signal of an object of display of the display section 29 includes an SD signal which originally was an SD signal as well as an SD signal converted from an HD signal by the down conversion section 19. From this, the user can visually observe an HD signal provided from the outside and an HD signal reproduced from the optical disk 51 or an image corresponding to any of such HD signals as just mentioned on the real time basis on the display section 29.

The HD main line image decompression section 30 decompression decodes an HD main line image signal as an ES signal provided thereto from the changeover section 24 in accordance with the MPEG system. Then, the HD main line image decompression section 30 provides an HD signal obtained as a result of the decompression decoding to the changeover section 31 and the down conversion section 19. As described hereinabove, the HD signal provided to the down conversion section 19 is converted into an SD signal and then is outputted to the outside through the changeover section 26, SD signal outputting section 27 and terminal 28 or is provided to the display section 29 so that a corresponding image is displayed on the display section 29.

The changeover section 31 changes over the input thereof between the HD main line image decompression section 30 side and the up conversion section 35 side under the control of the control section or the like not shown.

In particular, where the input of the changeover section 31 is changed over to the HD main line image decompression section 30 side, an HD signal outputted from the HD main line image decompression section 30, that is, an HD signal converted from an HD main line image signal as described hereinabove, is inputted to the changeover section 31 and provided to the HD signal outputting section 32.

On the other hand, where the input of the changeover section 31 is changed over to the up conversion section 35 side, an HD signal outputted from the up conversion section 35 is inputted to the changeover section 31 and provided to the HD signal outputting section 32. The HD signal outputted from the up conversion section 35 is obtained as a result of an up conversion process executed for an SD signal by the up conversion section 35 and may be, for example, an HD signal corresponding to an HD Proxy signal recorded on the optical disk 51 together with an HD main line image signal.

It is to be noted that, generally where a shuttle reproduction or fast feed reproduction function or a thumbnail function is utilized, the input of the changeover section 31 is changed over to the up conversion section 35 side. In particular, in order to implement the shuttle reproduction or fast feed reproduction function or the thumbnail function also with regard to an HD signal similarly with regard to an SD signal, an HD Proxy signal or a corresponding HD signal is utilized in place of an HD main line image signal or a corresponding HD signal.

The HD signal outputting section 32 outputs an HD signal provided thereto from the changeover section 31 to the outside through the terminal 33.

The Proxy image decompression section 34 performs a process of converting a Proxy signal read out from the optical disk 51 by the optical disk recording/reproduction section 18 into an SD signal and provides the resulting SD signal to the changeover section 26. Where the SD signal provided to the changeover section 26 is an SD signal converted from an SD Proxy signal, the SD signal is outputted to the outside through the SD signal outputting section 27 and the terminal 28. On the other hand, where the SD signal provided to the changeover section 26 is an SD signal converted from an HD Proxy signal, the SD signal is converted into an HD signal by the up conversion section 35 hereinafter described. Consequently, the HD signal after the conversion is outputted to the outside through the changeover section 31, HD signal outputting section 32 and terminal 33.

As described hereinabove, Proxy signals are divided into various types such as an image size reduction type Proxy signal and an intra compression type Proxy signal. Therefore, the process of conversion into an SD signal by the Proxy image decompression section 34 differs depending upon the type of a Proxy signal before the conversion similarly to the process of conversion into a Proxy signal by the Proxy image compression section 21.

It is to be noted here that, for the simplification of description, an image size reduction type Proxy signal is adopted as described hereinabove. In other words, an image size reduction type Proxy signal is recorded on the optical disk 51.

In this instance, the Proxy image decompression section 34 executes a process of converting an image size reduction type Proxy signal into an SD signal.

The Proxy image decompression section 34 can execute such a process of converting an image size reduction type Proxy signal into an SD signal. To this end, the Proxy image decompression section 34 may be formed, for example, from a decompression decoding section 81 and a Proxy/SD image size conversion section 82 as seen in FIG. 3.

Figure 3:
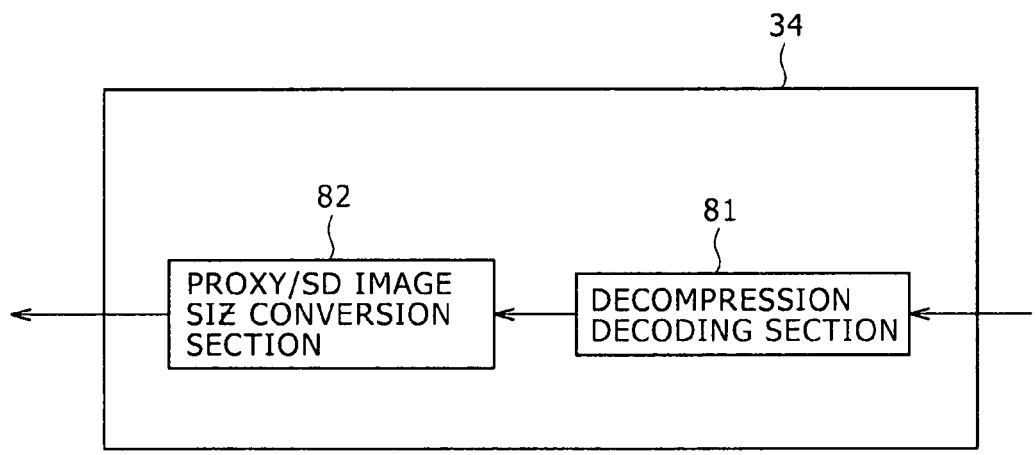
FIG. 3 is a block diagram showing an example of a detailed configuration of a Proxy image decompression section of the optical disk recording and reproduction apparatus of FIG. 1.

Referring to FIG. 3, the decompression decoding section 81 decompression decodes a Proxy signal as an ES signal read out from the optical disk 51 by the optical disk recording/reproduction section 18 shown in FIG. 1 in accordance with the MPEG system. Then, the decompression decoding section 81 provides an image size reduction signal obtained as a result of the decompression decoding, that is, a restored signal of an output signal of the SD/Proxy image size conversion section 71 shown in FIG. 2, to the Proxy/SD image size conversion section 82.

The Proxy/SD image size conversion section 82 executes a process of expanding the image size for an image size reduction signal provided thereto from the decompression decoding section 81, and provides an SD signal obtained as a result of the process to the changeover section 26 shown in FIG. 1. More particularly, the Proxy/SD image size conversion section 82 executes a process of expanding, for example, the image size of horizontally 352 pixels×vertically 240 pixels into another image size of 720 pixels×480 effective lines.

In other words, the Proxy/SD image size conversion section 82 executes a process inverse to the conversion process executed by the SD/Proxy image size conversion section 71 shown in FIG. 2.

Referring back again to FIG. 1, the up conversion section 35 performs an up conversion process for an SD signal provided from the changeover section 26, for example, an SD signal converted from an SD Proxy signal as described hereinabove. Then, the up conversion section 35 provides an HD signal obtained as a result of the up conversion process to the changeover section 31.

Now, a recording process from among various processes or actions of the optical disk recording and reproduction apparatus 1-1 shown in FIG. 1 is described with reference to a flow chart of FIG. 4. The recording process is a series of processes until an HD signal or an SD signal provided from the outside is converted into and recorded as an HD or SD main line image signal and a Proxy signal on the optical disk 51.

The recording process is started when an HD signal or an SD signal is inputted from the outside.

At step S1, the optical disk recording and reproduction apparatus 1-1 decides whether or not an SD signal is inputted.

If an SD signal is inputted to the SD signal inputting section 15 through the terminal 14, then a decision of YES is made at step S1. Then, the SD signal is provided to the SD main line image compression section 16 and is provided also to the Proxy image compression section 21 through the changeover section 20. Then, the processing advances to step S2.

At step S2, the SD main line image compression section 16 produces an SD main line image signal from the SD signal.

Further, at step S3, the Proxy image compression section 21 produces an SD Proxy signal from the SD signal.

Figure 4:
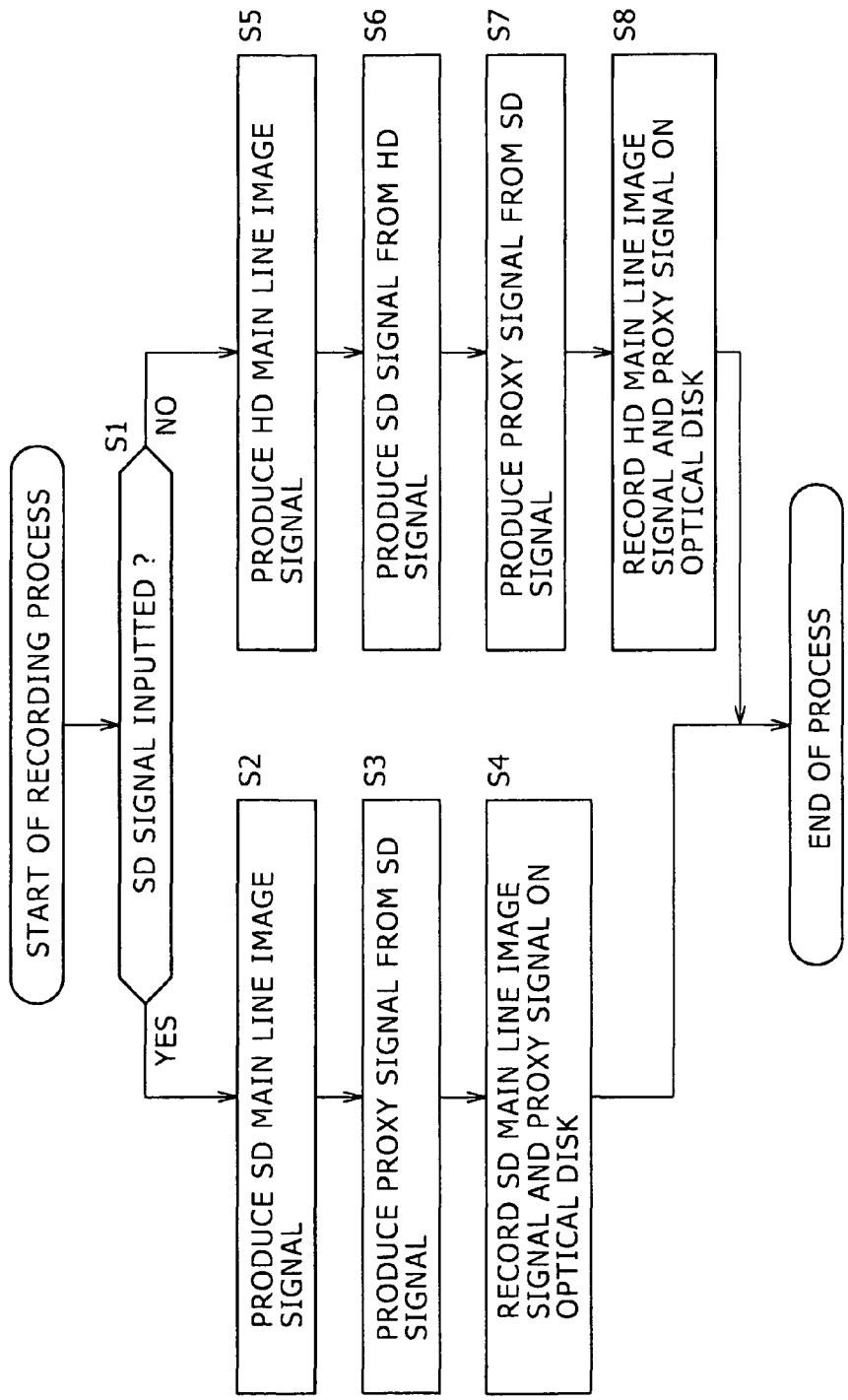
FIG. 4 is a flow chart illustrating an example of a recording process of the optical disk recording and reproduction apparatus of FIG. 1.

It is to be noted that, while it is illustrated in FIG. 4 that the process at step S3 is executed after the process at step S2 for the convenience of illustration, the process at step S3 may be executed independently during execution of the process at step S2. In other words, the production process of an SD Proxy signal may be executed during, before or after execution of the production process of an SD main line image signal.

After the SD main line image signal produced in the process at step S2 and the SD Proxy signal produced in the process at step S3 are provided to the optical disk recording/reproduction section 18, the processing advances to step S4.

At step S4, the optical disk recording/reproduction section 18 records the SD main line image signal and the SD Proxy signal on the optical disk 51. The recording process is completed therewith.

It is to be noted that, while it is illustrated in that the process at step S4 is executed after both of the processes at steps S2 and S3 are ended, the produced SD main line image signal or the SD Proxy signal may be recorded on the optical disk 51 immediately after the process at step S2 or S3 comes to an end irrespective of the stage of the other process.

In this manner, in the optical disk recording and reproduction apparatus 1-1 of FIG. 1, if an SD signal is inputted, then a decision of YES is made by the process at step S1 that an SD signal is inputted, and then the processes at steps S2 to S4 are executed. As a result, an SD main line image signal and an SD Proxy signal corresponding to the SD signal are recorded on the optical disk 51.

On the other hand, if an HD signal is inputted, then a decision of NO is made by the process at step S1 that an SD signal is not inputted, and then such processes at steps S5 to S8 as described below are executed. As a result, an HD main line image signal and an HD Proxy signal corresponding to the HD signal are recorded on the optical disk 51.

In particular, if an HD signal is inputted to the HD signal inputting section 12 through the terminal 11, then it is decided at step S1 that an SD signal is not inputted. Thus, the HD signal is provided to the HD main line image compression section 13 and also to the down conversion section 19. Consequently, the processing advances to step S5.

At step S5, the HD main line image compression section 13 produces an HD main line image signal from the HD signal.

Further, at step S6, the down conversion section 19 produces an SD signal from the HD signal and provides the SD signal to the Proxy image compression section 21 through the changeover section 20. Then, at step S7, the Proxy image compression section 21 produces an HD Proxy signal from the SD signal.

It is to be noted that, while it is illustrated in FIG. 4 that the series of processes at step S6 and S7 is executed after the process at step S5 for the convenience of illustration, the series of the processes at step S6 and S7 may be executed independently during execution of the process at step S5. In particular, the production process of an HD Proxy signal may be executed during, before or after execution of the production process of an HD main line image signal.

After the HD main line image signal produced by the process at step S5 and the HD Proxy signal produced by the series of processes at step S6 and S7 are provided to the optical disk recording/reproduction section 18, the processing advances to step S8.

At step S8, the optical disk recording/reproduction section 18 records the HD main line image signal and the HD Proxy signal on the optical disk 51. The recording process completed therewith.

It is to be noted that, while it is illustrated in FIG. 4 that the process at step S8 is executed after the series of processes at step S6 and S7 is ended for the convenience of illustration, the produced HD main line image signal or the HD Proxy signal may be recorded on the optical disk 51 immediately after the process at step S5 or the series of processes at step S6 and S7 is ended irrespective of the stage of the other process.

Further, the optical disk recording and reproduction apparatus 1-1 of FIG. 1 can execute also a process for reproducing a Proxy signal recorded on the optical disk 51 in such a manner as described above. The process just mentioned is hereinafter referred to as Proxy signal reproduction process. It is to be noted, however, that the Proxy signal reproduction process is hereinafter described as a Proxy signal reproduction process of an optical disk reproduction apparatus 111-1 of FIG. 15 with reference to a flow chart of FIG. 16. The optical disk reproduction apparatus 111-1 is formed as an apparatus which is a reproduction function which is one of functions of the optical disk recording and reproduction apparatus 1-1 of FIG. 1.

As described above, even where an HD signal is inputted, the optical disk recording and reproduction apparatus 1-1 of FIG. 1 can down convert the HD signal to convert the HD signal into an SD signal and then produce an HD Proxy signal from the SD signal. Therefore, the format of the HD Proxy signal can be made same as that of the SD Proxy signal.

As a result, the Proxy image compression section 21 for producing a Proxy signal and the Proxy image decompression section 34 for restoring an original base band signal, which is an SD signal in FIG. 1, from the Proxy signal need not be provided independently for an SD signal and an HD signal. Therefore, a first effect can be implemented that the Proxy image compression section 21 and the Proxy image decompression section 34 need not be provided separately from each other and can be formed as a common section.

Further, as described above, a second effect can be implemented that a system in related art which utilizes an SD Proxy signal can be applies as it is as a system which utilizes an HD Proxy signal such as, for example, a system hereinafter described with reference to FIG. 13. It is to be noted that the definition of the term "system" is hereinafter described. Thus, from a point of view of the user, a second effect can be implemented that the user can utilize the system in related art as it is to carry out such operation as deputy editing in which an HD Proxy signal is used quite similarly to operation in the past such as deputy editing in which an SD Proxy signal is used.

In order to implement the first and second effects described above, a technique wherein an HD Proxy signal and a Proxy signal SD are produced in the same format may be applied as a production technique of a Proxy signal. The production technique just mentioned is hereinafter referred to as Proxy signal production technique.

In particular, it is assumed that one Proxy image compression section 21 configured to produce a Proxy signal from an SD signal is provided for the optical disk recording and reproduction apparatus 1-1 of FIG. 1. Further, a down conversion Proxy signal production technique is applied in order to produce an HD Proxy signal. According to the down conversion Proxy signal production technique, the down conversion section 19 down converts the HD signal into an SD signal, and then the Proxy image compression section 21 processes the SD signal.

However, the Proxy signal production technique is not limited to the down conversion Proxy signal production technique. For example, a technique inverse to the down converting Proxy signal production technique, that is, also an up conversion Proxy signal production technique, can be applied. According to the up conversion Proxy signal production technique, it is assumed that one Proxy image compression section configured to produce a Proxy signal from an HD signal is provided. Further, an up conversion Proxy signal production technique is applied in order to produce an SD Proxy signal. According to the up conversion Proxy signal production technique, the up conversion section 35 up converts the SD signal into an HD signal, and then the Proxy image compression section 21 processes the HD signal.

Figure 5:
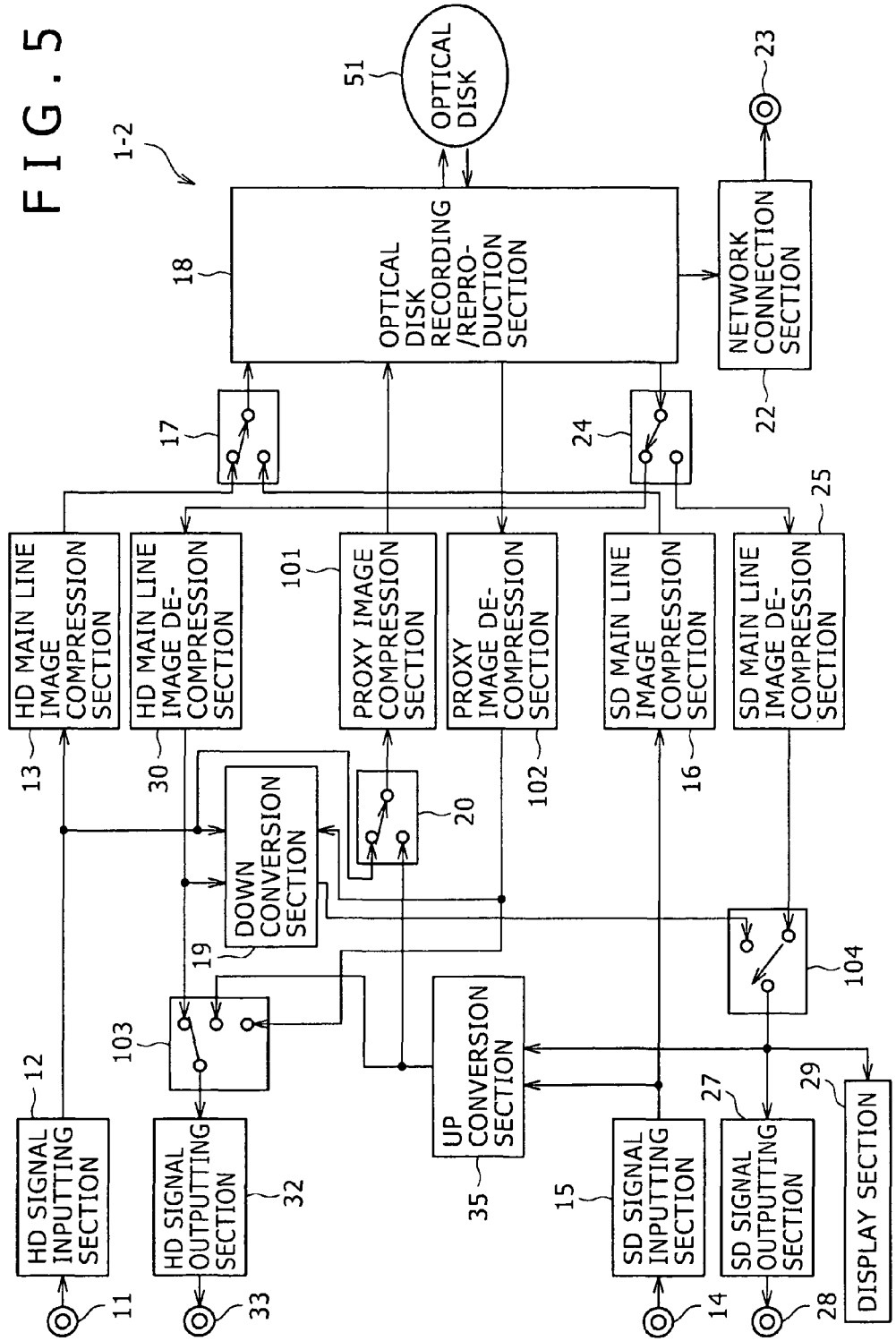
FIG. 5 is a block diagram showing another example of a configuration of an optical disk recording and reproduction apparatus to which the present invention is applied.

An example of an optical disk recording and reproduction apparatus to which the up converting Proxy signal production technique is applied is shown in FIG. 5. In particular, FIG. 5 shows an example of a configuration of the optical disk recording and reproduction apparatus to which the present invention is applied, which is different from that of FIG. 1.

Referring to FIG. 5, the optical disk recording and reproduction apparatus 1-2 is a modification to and includes similar components to those of the optical disk recording and reproduction apparatus 1-1 described hereinabove with reference to FIG. 1.

Here, the optical disk recording and reproduction apparatus 1-2 of FIG. 5 is compared with the optical disk recording and reproduction apparatus 1-1 of FIG. 1. It can be seen that the optical disk recording and reproduction apparatus 1-2 of FIG. 5 includes a Proxy image compression section 101 hereinafter described with reference to FIG. 6 in place of the Proxy image compression section 21 shown in FIG. 1 or FIG. 2. The optical disk recording and reproduction apparatus 1-2 of FIG. 5 further includes a Proxy image decompression section 102 hereinafter described with reference to FIG. 7 in place of the Proxy image decompression section 34 shown in FIG. 1 or FIG. 3. The optical disk recording and reproduction apparatus 1-2 of FIG. 5 further includes a pair of changeover sections 103 and 104 in place of the changeover sections 31 and 26 shown in FIG. 1, respectively. The other components or blocks of the optical disk recording and reproduction apparatus 1-2 of FIG. 5 have configurations and functions basically similar to those of the corresponding blocks of the optical disk recording and reproduction apparatus 1-1 of FIG. 1. However, the input/output destinations of the blocks are somewhat different.

In the following, only the different ones of the components of the optical disk recording and reproduction apparatus 1-2 of FIG. 5 from those of the optical disk recording and reproduction apparatus 1-1 of FIG. 1 are described below.

In the optical disk recording and reproduction apparatus 1-1 of FIG. 1, the SD main line image compression section 16 and the changeover section 20 are determined as outputting destinations of the SD signal inputting section 15, that is, providing destinations of the SD signal. However, in the optical disk recording and reproduction apparatus 1-2 of FIG. 5, the SD main line image compression section 16 and the up conversion section 35 are selected as providing destinations of the SD signal.

On the other hand, in the optical disk recording and reproduction apparatus 1-1 of FIG. 1, the HD main line image compression section 13 and the down conversion section 19 are determined as outputting destinations of the HD signal inputting section 12, that is, providing destinations of the HD signal. Meanwhile, in the optical disk recording and reproduction apparatus 1-2 of FIG. 5, the HD main line image compression section 13 and the down conversion section 19 as well as the changeover section 20 are determined as the providing destinations of the HD signal.

Further, in the optical disk recording and reproduction apparatus 1-1 of FIG. 1, the changeover sections 20 and 26 are determined as outputting destination of the down conversion section 19. Meanwhile, in the optical disk recording and reproduction apparatus 1-2 of FIG. 5, only the changeover section 104 is determined as an outputting destination of the down conversion section 19. Further, in the optical disk recording and reproduction apparatus 1-1 of FIG. 1, only the changeover section 31 is determined as an outputting destination of the up conversion section 35. Meanwhile, in the optical disk recording and reproduction apparatus 1-2 of FIG. 5, the changeover sections 20 and 103 are determined as outputting destinations of the up conversion section 35. In other words, in the optical disk recording and reproduction apparatus 1-1 of FIG. 1, the inputting of the changeover section 20 is performed from the down conversion section 19 side and the SD signal inputting section 15 side. On the other hand, in the optical disk recording and reproduction apparatus 1-2 of FIG. 5, the inputting of the changeover section 20 is performed from the HD signal inputting section 12 side and the up conversion section 35 side.

From the foregoing, in the optical disk recording and reproduction apparatus 1-2 of FIG. 5, where the inputting of the changeover section 20 is changed over to the HD signal inputting section 12 side, an HD signal outputted from the HD signal inputting section 12 is inputted to the changeover section 20 and is provided to the Proxy image compression section 101. In this instance, an HD Proxy signal is produced by the Proxy image compression section 101 as hereinafter described.

On the other hand, the inputting of the changeover section 20 is changed over to the up conversion section 35 side, an HD signal outputted from the up conversion section 35 is inputted to the changeover section 20. In particular, the up conversion process is performed for the SD signal inputted to the SD signal inputting section 15 by the up conversion section 35, and an HD signal obtained by the up conversion process is inputted to the changeover section 20. Then, the HD signal is provided from the changeover section 20 to the Proxy image compression section 101. In this instance, an SD Proxy signal is produced by the Proxy image compression section 101 as hereinafter described.

The Proxy image compression section 101 performs a process for converting an HD signal provided from the changeover section 20 into a Proxy signal and provides the Proxy signal obtained by the process to the optical disk recording/reproduction section 18.

As described above, various kinds or types of Proxy signals such as an image size reduction type Proxy signal, an intra compression type Proxy signal and so forth exist. Therefore, the process of converting an HD signal into a Proxy signal performed by the Proxy image compression section 101 is different depending upon the type of the Proxy signal to be obtained by the conversion.

It is to be noted here that, for the simplification of description, an image size reduction type Proxy signal is applied as described above. In other words, an image size reduction type Proxy signal is recorded on the optical disk 51.

In this instance, the Proxy image compression section 101 executes a process of converting an HD signal into an image size reduction type Proxy signal.

In order to execute such a process of converting an HD signal into an image size reduction type Proxy signal as described above, the Proxy image compression section 101 is formed, for example, from an HD/Proxy image size conversion section 111 and a compression encoding section 112 as shown in FIG. 6.

The HD/Proxy image size conversion section 111 performs a process for reducing the image size for an HD signal provided from the changeover section 20 shown in FIG. 5. For example, the HD/Proxy image size conversion section 111 performs a process of reducing the image size of horizontally 1,920 pixels×vertically 1,080 pixels to another image size of horizontally 352 pixels×vertically 240 pixels for the HD signal. Then, the HD/Proxy image size conversion section 111 provides an image size reduction signal obtained as a result of the conversion to the compression encoding section 112.

The compression encoding section 112 has a function and a configuration similar to those of the compression encoding section 72 shown in FIG. 2. In particular, the compression encoding section 112 performs a compression encoding process, for example, in accordance with the MPEG system for the image size reduction signal provided from the HD/Proxy image size conversion section 111. Then, the compression encoding section 112 provides an ES signal obtained by the compression encoding process as a Proxy signal, more accurately as an image size reduction type Proxy signal, to the optical disk recording/reproduction section 18 shown in FIG. 5.

An example of a configuration of the Proxy image decompression section 102 shown in FIG. 5 which corresponds to such a Proxy image compression section 101 as described above with reference to FIG. 6 is shown in FIG. 7.

Referring to FIG. 7, the Proxy image decompression section 102 shown includes a decompression decoding section 121 and a Proxy/HD image size conversion section 122.

The decompression decoding section 121 has a function and a configuration similar to those of the decompression decoding section 81 in FIG. 3. In particular, the decompression decoding section 121 performs a decompression decoding process in accordance with the MPEG system for a Proxy signal as an ES signal read out from the optical disk 51 by the optical disk recording/reproduction section 18 shown in FIG. 5. Then, the decompression decoding section 121 provides an image size reduction signal obtained as a result of the decompression decoding process, that is, a restored signal of an output signal of the HD/Proxy image size conversion section 111 shown in FIG. 6, to the Proxy/HD image size conversion section 122.

The Proxy/HD image size conversion section 122 performs a process of expanding the image size for the image size reduction signal provided from the decompression decoding section 121. In particular, the Proxy/HD image size conversion section 122 expands, for example, the image size of horizontally 352 pixels×vertically 240 pixels to another image size of horizontally 1,920 pixels×vertically 1,080 pixels. Then, the Proxy/HD image size conversion section 122 provides an HD signal obtained by the process to the changeover section 103 shown in FIG. 5.

In other words, the Proxy/HD image conversion section 122 executes a conversion process inverse to that executed by the HD/Proxy image size conversion section 111 in FIG. 6.

Referring back to FIG. 5, the changeover section 103 changes over the input thereof to one of the HD main line image decompression section 30 side, up conversion section 35 side and Proxy image decompression section 102 side under the control of a control section or the like not shown.

In particular, where the input of the changeover section 103 is changed over to the HD main line image decompression section 30 side, an HD signal outputted from the HD main line image decompression section 30, that is, an HD signal converted from the HD main line image signal, is inputted to the changeover section 103 and provided to the HD signal outputting section 32.

Further, where the input of the changeover section 103 is changed over to the up conversion section 35 side, an HD signal outputted from the up conversion section 35, that is, an HD signal obtained by the up conversion process performed by the up conversion section 35 for the SD signal, is inputted to the changeover section 103 and provided to the HD signal outputting section 32.

Further, where the input of the changeover section 103 is changed over to the Proxy image decompression section 102 side, an HD signal outputted from the Proxy image decompression section 102, that is, an HD signal converted from an HD Proxy signal, is inputted to the changeover section 103 and provided to the HD signal outputting section 32.

The changeover section 104 changes over the input thereof to one of the SD main line image decompression section 25 side and the down conversion section 19 side under the control of the control section or the like not shown.

In particular, where the input of the changeover section 104 is changed over to the SD main line image decompression section 25 side, an SD signal outputted from the SD main line image decompression section 25, that is, an SD signal converted from the SD main line image signal, is inputted to the changeover section 104. The SD signal inputted is provided to the SD signal outputting section 27, displaying section 29 and up conversion section 35.

On the other hand, where the input of the changeover section 104 is changed over to the down conversion section 19 side, an SD signal outputted from the down conversion section 19 is inputted to the changeover section 104. Then, the SD signal is provided to the SD signal outputting section 27, displaying section 29 and up conversion section 35. It is to be noted that the SD signal outputted from the down conversion section 19 is an SD signal obtained by the down conversion process performed by the down conversion section 19 for an HD signal inputted from the outside, an HD signal converted from the HD main line image signal, or an HD signal converted from the SD Proxy signal.

Those components of the optical disk recording and reproduction apparatus 1-2 of FIG. 5 which are different from those of the optical disk recording and reproduction apparatus 1-1 of FIG. 1 are described above. In other words, the components of the optical disk recording and reproduction apparatus 1-2 in the example of FIG. 5 other than those described above are similar to corresponding ones of the optical disk recording and reproduction apparatus 1-1 of FIG. 1.

Next, an example of a recording process of the optical disk recording and reproduction apparatus 1-2 of FIG. 5 is described with reference to a flow chart of FIG. 8.

When an HD signal or an SD signal is inputted from the outside, the recording process is started.

At step S21, the optical disk recording and reproduction apparatus 1-2 decides whether or not an SD signal is inputted.

If an SD signal is inputted to the SD signal inputting section 15 through the terminal 14, then it is decided at step S21 that the SD signal is inputted. The inputted SD signal is provided to the SD main line image compression section 16 and provided also to the up conversion section 35. Then, the processing advances to step S22.

At step S22, the SD main line image compression section 16 produces an SD main line image signal from the SD signal.

Further, at step S23, the up conversion section 35 produces an HD signal from the SD signal and provides the produced HD signal to the Proxy image compression section 101 through the changeover section 20. Then, at step S24, the Proxy image compression section 101 produces an SD Proxy signal from the HD signal.

Figure 8:
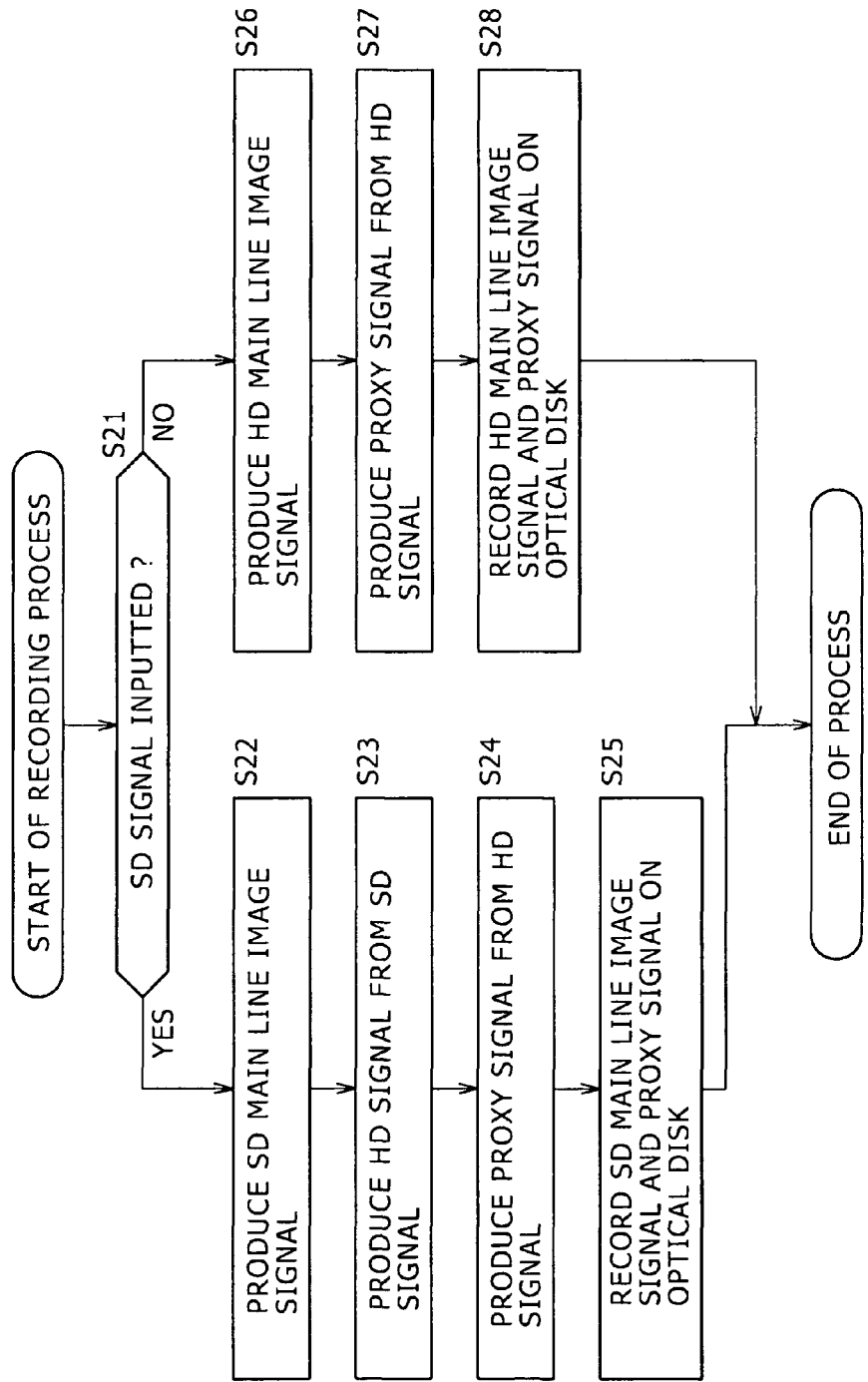
FIG. 8 is a flow chart illustrating an example of a recording process of the optical disk recording and reproduction apparatus of FIG. 5.

It is to be noted that, while it is illustrated in FIG. 8 that the series of processes at steps S23 and S24 is executed after the process at step S22 is ended for the convenience of illustration, the series of processes at steps S23 and S24 may be executed independently during execution of the process at step S22. In particular, the corresponding production process for producing an SD Proxy signal may be executed during, before and after execution of the production process of an SD main line image signal.

After the SD main line image signal produced in the process at step S22 and the SD Proxy signal produced in the series of processes at steps S23 and S24 are provided to the optical disk recording/reproduction section 18, the processing advances to step S25.

At step S25, the optical disk recording/reproduction section 18 records the SD main line image signal and the SD Proxy signal on the optical disk 51. Then, the recording process is ended.

It is to be noted that it is illustrated in FIG. 8 that the process at step S25 is executed after both of the process at step S22 and the series of processes at steps S23 and S24 are ended for the convenience of illustration. However, the produced SD main line image signal or SD Proxy signal may be recorded on the optical disk 51 irrespective of the stage of the other process immediately after the process at step S22 or the series of processes at steps S23 and S24 is ended.

In this manner, in the optical disk recording and reproduction apparatus 1-2 of FIG. 5, if an SD signal is inputted, then it is decided by the process at step S21 that an SD signal is inputted, and then the processes at steps S22 to S25 are executed. As a result, an SD signal main line image signal and an SD Proxy signal which correspond to the inputted SD signal are recorded on the optical disk 51.

On the other hand, if an HD signal is inputted, then it is decided by the process at step S21 that an SD signal is not inputted, and then such processes at steps S26 to S28 as described below are executed. As a result, an HD main line image signal and an HD Proxy signal which correspond to the inputted HD signal are recorded on the optical disk 51.

In particular, if an HD signal is inputted to the HD signal inputting section 12 through the terminal 11, then it is decided at step S21 that an SD signal is not inputted. The HD signal is provided to the HD main line image compression section 13 and is provided also to the Proxy image compression section 101 through the changeover section 20. Then, the processing advances to step S26.

At step S26, the HD main line image compression section 13 produces an HD main line image signal from the HD signal.

Further, at step S27, the Proxy image compression section 101 produces an HD Proxy signal from the HD signal.

It is to be noted that, while it is illustrated in FIG. 8 that the process at step S27 is executed after the process at step S26 is ended for the convenience of illustration, the process at step S27 may be executed independently during execution of the process at step S26. In particular, a production process of an HD Proxy signal may be executed during, before and after execution of the production process of an HD main line image signal.

After the HD main line image signal produced in the process at step S26 and the Proxy signal produced in the process at step S27 are provided to the optical disk recording/reproduction section 18, the processing advances to step S28.

At step S28, the optical disk recording/reproduction section 18 records the HD main line image signal and HD Proxy signal on the optical disk 51. Then, the recording process is ended.

It is to be noted that, while it is illustrated in FIG. 8 that the process at step S28 is executed after both of the processes at steps S26 and S27 are ended for the convenience of illustration, the produced HD main line image signal and HD Proxy signal may be recorded on the optical disk 51 immediately after the process at step S26 or S27 is ended irrespective of the stage of the other process.

Further, the optical disk recording and reproduction apparatus 1-2 of FIG. 5 can execute also a Proxy signal reproduction apparatus. However, such a Proxy signal reproduction apparatus as just mentioned is hereinafter described as a Proxy signal reproduction process of an optical disk reproduction apparatus 111-2 of FIG. 18 with reference to a flow chart of FIG. 19. The optical disk reproduction apparatus 111-2 is formed as an apparatus which has the reproduction function of the optical disk recording and reproduction apparatus 1-2 of FIG. 5.

As described above, not only the optical disk recording and reproduction apparatus 1-1 of FIG. 1 but also the optical disk recording and reproduction apparatus 1-2 of FIG. 5 can record a signal of the same format such as an image size reduction type Proxy signal on the optical disk 51.

This is because the compression encoding section 72 shown in FIG. 2 of the Proxy image compression section 21 shown in FIG. 1 and the compression encoding section 112 shown in FIG. 6 of the Proxy image compression section 101 shown in FIG. 5 have similar functions and configurations to each other.

In particular, the input signals to the compression encoding sections 72 and 112 are signals of the same format such as an image size reduction signal having an image size of horizontally 352 pixels×vertically 240 pixels. Besides, similar processes to each other are performed for the image size reduction signal by both of the compression encoding sections 72 and 112. Therefore, both of signals obtained by the processes, that is, output signals of the compression encoding sections 112 and 72, have the same format such as a format of an image size reduction type Proxy signal.

However, in this instance, a process of converting an SD signal or an HD signal into an image size reduction signal is required. In particular, a process of converting an SD signal into an image size reduction signal is executed by the SD/Proxy image size conversion section 71 shown in FIG. 2. Meanwhile, a process of converting an HD signal into an image size reduction signal is executed by the HD/Proxy image size conversion section 111 shown in FIG. 6.

Accordingly, since the Proxy image compression section 21 shown in FIG. 1 incorporates only the SD/Proxy image size conversion section 71 shown in FIG. 2, an HD signal is inputted to the Proxy image compression section 21 after it is converted into an SD signal in advance by the down conversion section 19. On the other hand, since the Proxy image compression section 101 shown in FIG. 5 incorporates only the HD/Proxy image size conversion section 111 shown in FIG. 6, an SD signal is inputted to the Proxy image compression section 101 after it is converted into an HD signal in advance by the up conversion section 35.

Figure 9:
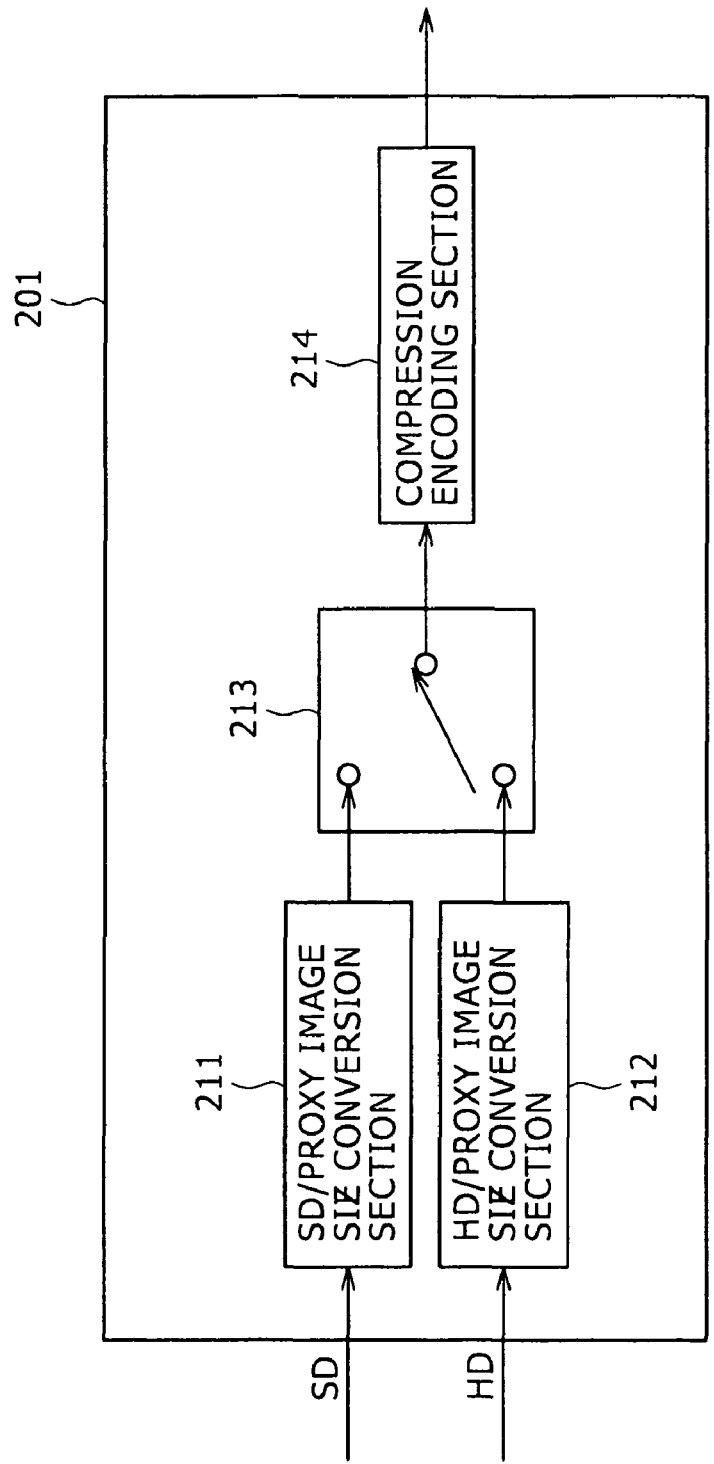
FIG. 9 is a block diagram showing an example of a detailed configuration of a Proxy image compression section different from those of FIGS. 2 and 6.

Therefore, where it is desired to input an HD signal and an SD signal as they are without converting into an SD signal or an HD signal, such a Proxy image compression section 201 as shown in FIG. 9 should be adopted. Referring to FIG. 9, the Proxy image compression section 201 includes both of an SD/Proxy image size conversion section 211 and an HD/Proxy image size conversion section 212. The SD/Proxy image size conversion section 211 has a function and a configuration similar to those of the SD/Proxy image size conversion section 71 shown in FIG. 2. Meanwhile, the HD/Proxy image size conversion section 212 has a function and a configuration similar to those of the HD/Proxy image size conversion section 111 shown in FIG. 6.

In other words, FIG. 9 shows an example of a detailed configuration of the Proxy image compression section 201 which has a different configuration from those shown in FIGS. 2 and 6.

Referring to FIG. 9, the Proxy image compression section 201 includes a changeover section 213 and a compression encoding section 214 in addition to the SD/Proxy image size conversion section 211 and the HD/Proxy image size conversion section 212 described hereinabove.

When an SD main line image signal is to be recorded on the optical disk 51, a corresponding SD signal is inputted to the SD/Proxy image size conversion section 211. On the other hand, when an HD main line image signal is to be recorded on the optical disk 51, a corresponding HD signal is inputted to the HD/Proxy image size conversion section 212.

The SD/Proxy image size conversion section 211 performs a process of converting the image size for an SD signal inputted thereto and provides an image size reproduction signal obtained as a result of the conversion to the changeover section 213. More particularly, the SD/Proxy image size conversion section 211 performs a process of converting, for example, the image size of 720 pixels×480 effective lines into the image size of horizontally 352 pixels×vertically 240 pixels.

On the other hand, the HD/Proxy image size conversion section 212 performs a process of reducing the image size for an HD signal inputted thereto and provides an image size reduction signal obtained as a result of the conversion to the changeover section 213. More particularly, the HD/Proxy image size conversion section 212 performs a process of converting, for example, the image size of horizontally 1,920 pixels×vertically 1,080 pixels into the image size of horizontally 352 pixels×vertically 240 pixels.

The changeover section 213 changes over the input thereof between the SD/Proxy image size conversion section 211 side and the HD/Proxy image size conversion section 212 side under the control of the control section or the like not shown.

More particularly, where the input of the changeover section 213 is changed over to the SD/Proxy image size conversion section 211 side, an image size reduction signal outputted from the SD/Proxy image size conversion section 211 is inputted to the changeover section 213 and provided to the compression encoding section 214.

On the other hand, where the input of the changeover section 213 is changed over to the HD/Proxy image size conversion section 212 side, an image size reduction signal outputted from the HD/Proxy image size conversion section 212 is inputted to the changeover section 213 and provided to the compression encoding section 214.

The compression encoding section 214 has functions and configurations similar to those of the compression encoding section 72 shown in FIG. 2 or the compression encoding section 112 shown in FIG. 6. In particular, the compression encoding section 214 compression encodes an image size reduction signal provided thereto from the changeover section 213 in accordance with the MPEG system. Then, the compression encoding section 214 provides an ES signal obtained as a result of the compression encoding as a Proxy signal, or more accurately as an image size reduction type Proxy signal, to the optical disk recording/reproduction section 18 hereinafter described with reference to FIG. 11.

In particular, when an image size reduction signal converted from an SD signal by the SD/Proxy image size conversion section 211 is provided to the compression encoding section 214 through the changeover section 213, an SD Proxy signal is produced by and outputted from the compression encoding section 214.

On the other hand, when an image size reduction signal converted from an HD signal by the HD/Proxy image size conversion section 212 is provided to the compression encoding section 214 through the changeover section 213, an HD Proxy signal is produced by and outputted from the compression encoding section 214.

Figure 10:
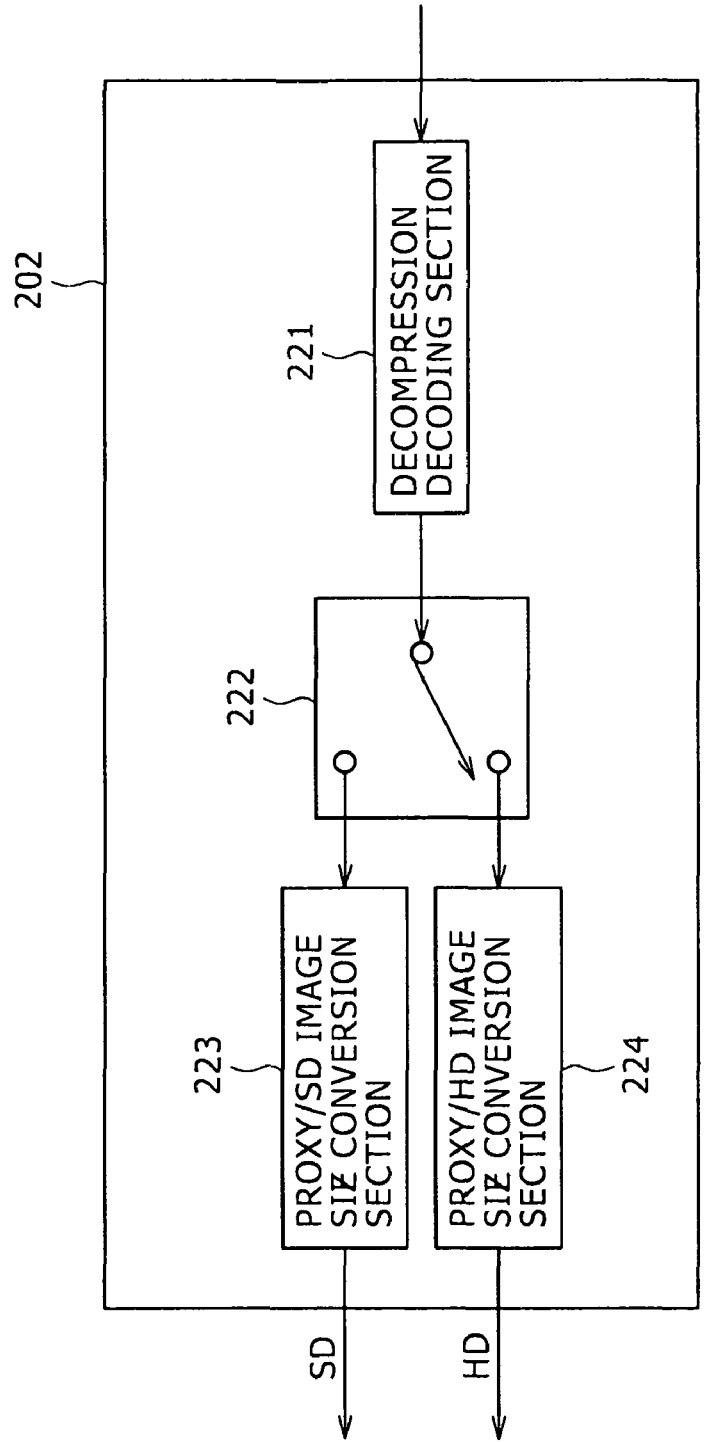
FIG. 10 is a block diagram showing an example of a detailed configuration of a Proxy image decompression section different from those of FIGS. 3 and 7.

An example of a configuration of a Proxy image compression section 201 corresponding to the Proxy image compression section 201 of the example of FIG. 9 is shown in FIG. 10.

Referring to FIG. 10, the Proxy image decompression section 202 shown includes a decompression decoding section 221, a changeover section 222, a Proxy/SD image size conversion section 223 and a Proxy/HD image size conversion section 224.

The decompression decoding section 221 has a function and a configuration similar to those of the decompression decoding section 81 shown in FIG. 3 or the decompression decoding section 121 shown in FIG. 7. In particular, the decompression decoding section 221 decompression decodes a Proxy signal as an ES signal read out from the optical disk 51 by the optical disk recording/reproduction section 18 hereinafter described with reference to FIG. 11. Then, the decompression decoding section 221 provides an image size reduction signal obtained as a result of the decompression decoding, that is, a restored signal of an output signal of the changeover section 213 shown in FIG. 9, to the changeover section 222.

The changeover section 222 changes over the output thereof between the Proxy/SD image size conversion section 223 side and the Proxy/HD image size conversion section 224 side under the control of the control section or the like not shown.

In particular, where an SD Proxy signal is inputted to the decompression decoding section 221, in particular, where such a decision as just mentioned is made by the controller or the like not shown, the input of the changeover section 222 is changed over to the Proxy/SD image size conversion section 223 side. Consequently, an image size reduction signal outputted from the decompression decoding section 221 is inputted to the changeover section 222 and provided to the Proxy/SD image size conversion section 223.

On the other hand, where an HD Proxy signal is inputted to the decompression decoding section 221, in particular, where such a decision as just mentioned is made by the controller or the like not shown, the input of the changeover section 222 is changed over to the Proxy/HD image size conversion section 224 side. Consequently, an image size reduction signal outputted from the decompression decoding section 221 is inputted to the changeover section 222 and provided to the Proxy/HD image size conversion section 224.

The Proxy/SD image size conversion section 223 has a function and a configuration similar to those of the Proxy/SD image size conversion section 82 described hereinabove with reference to FIG. 3. In particular, the Proxy/SD image size conversion section 223 performs a process of expanding the image size of an image size reduction signal provided thereto from the changeover section 222 to the image size of an SD signal and outputs an SD signal obtained as a result of the process. For example, the Proxy/SD image size conversion section 223 performs a process of expanding the image size of horizontally 352 pixels×vertically 240 pixels to the image size of 720 pixels×480 effective lines. It is to be noted that a particular example of the output destination is hereinafter described with reference to FIG. 11.

In other words, the Proxy/SD image size conversion section 223 performs a process inverse to the conversion process executed by the SD/Proxy image size conversion section 211 shown in FIG. 9.

Meanwhile, the Proxy/HD image size conversion section 224 has a function and a configuration similar to those of the Proxy/HD image size conversion section 122 shown in FIG. 7 as described hereinabove. In particular, the Proxy/HD image size conversion section 224 performs a process of expanding the image size of an image size reduction signal provided thereto from the changeover section 222 to the image size of an HD signal and outputs an HD signal obtained as a result of the process. For example, the Proxy/HD image size conversion section 224 performs a process of expanding the image size of horizontally 352 pixels×vertically 240 pixels to the image size of horizontally 1,920 pixels×vertically 1,080 pixels. It is to be noted that a particular example of the output destination is hereinafter described with reference to FIG. 11.

In other words, the Proxy/HD image size conversion section 224 performs a process inverse to the conversion process executed by the HD/Proxy image size conversion section 212 shown in FIG. 9.

An example of a configuration of an optical disk recording and reproduction apparatus in which such a Proxy image compression section 201 and a Proxy image decompression section 202 as described above are incorporated is shown in FIG. 11. In particular, FIG. 11 shows an example of a configuration of an optical disk recording and reproduction apparatus to which the present invention is applied, different from those of the examples shown in FIGS. 1 and 5.

Figure 11:
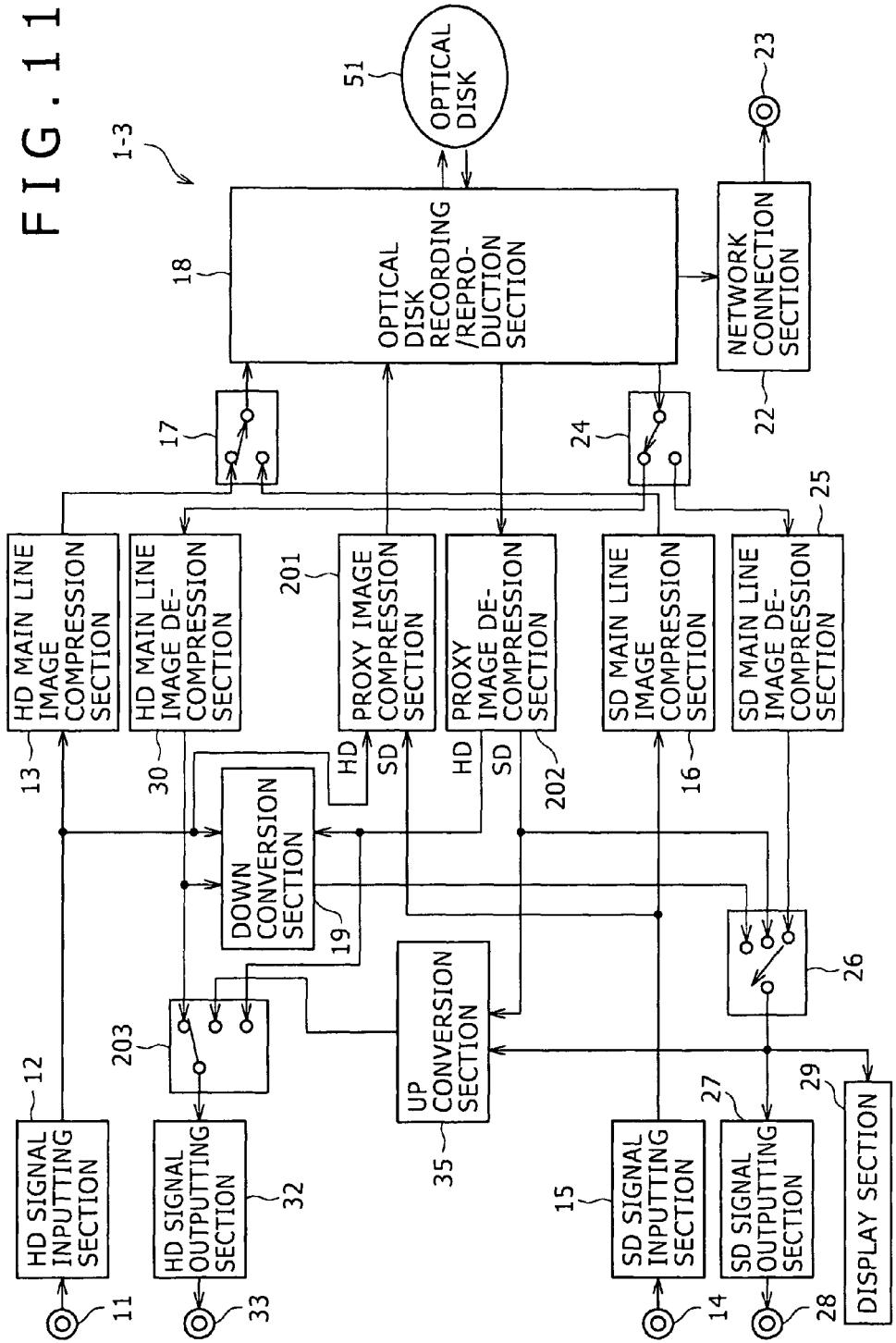
FIG. 11 is a block diagram showing a further example of a configuration of an optical disk recording and reproduction apparatus to which the present invention is applied where the Proxy image compression section of FIG. 9 and the Proxy image decompression section of FIG. 10 are incorporated.

Referring to FIG. 11, the optical disk recording and reproduction apparatus 1-3 is a modification to and includes similar components to those of the optical disk recording and reproduction apparatus 1-1 described hereinabove with reference to FIG. 1.

In particular, where the optical disk recording and reproduction apparatus 1-3 of FIG. 11 is compared with the optical disk recording and reproduction apparatus 1-1 of FIG. 1, it can be seen that, in the optical disk recording and reproduction apparatus 1-3 of FIG. 11, the Proxy image compression section 201 shown in FIG. 9 is provided in place of the Proxy image compression section 21 shown in FIG. 1 or 2. Further, the Proxy image decompression section 202 of FIG. 10 is provided in place of the Proxy image decompression section 34 shown in FIG. 1 or 3. Furthermore, a changeover section 203 is provided in place of the changeover section 31 shown in FIG. 1. Further, an HD signal which is an output signal of the HD signal inputting section 12 and an SD signal which is an output signal of the SD signal inputting section 15 are both inputted directly to the Proxy image compression section 201. Therefore, the changeover section 20 provided in the optical disk recording and reproduction apparatus 1-1 of FIG. 1 is omitted in the optical disk recording and reproduction apparatus 1-3 of FIG. 11. It is to be noted that, although the other components or blocks of the optical disk recording and reproduction apparatus 1-3 of FIG. 11 are basically similar in configuration and function to those of the like reference characters of the optical disk recording and reproduction apparatus 1 of FIG. 1, the input/output destinations of the blocks are somewhat different.

In the following description, only such differences in configuration of the optical disk recording and reproduction apparatus 1-3 of FIG. 11 from the optical disk recording and reproduction apparatus 1-1 of FIG. 1 as described above are described particularly.

In the optical disk recording and reproduction apparatus 1-1 of FIG. 1, the SD main line image compression section 16 and the changeover section 20 are set as the output destinations of the SD signal inputting section 15, that is, the providing destinations of an SD signal. However, in the optical disk recording and reproduction apparatus 1-3 of FIG. 11, the SD main line image compression section 16 and the Proxy image compression section 201, more particularly the SD/Proxy image size conversion section 211 shown in FIG. 9, are set as the output destinations of the SD signal inputting section 15.

Further, in the optical disk recording and reproduction apparatus 1-1 of FIG. 1, the HD main line image compression section 13 and the down conversion section 19 are set as the output destinations of the HD signal inputting section 12, that is, the providing destinations of an HD signal. However, in the optical disk recording and reproduction apparatus 1-3 of FIG. 11, the HD main line image compression section 13 and the down conversion section 19 as well as the Proxy image compression section 201, more particularly the HD/Proxy image size conversion section 212 shown in FIG. 9, are set as the output destinations of the HD signal inputting section 12.

Furthermore, in the optical disk recording and reproduction apparatus 1-1 of FIG. 1, the changeover section 20 and the changeover section 26 are set as the output destinations of the down conversion section 19. However, in the optical disk recording and reproduction apparatus 1-3 of FIG. 11, only the changeover section 26 is set as the output destination of the down conversion section 19. Further, in the optical disk recording and reproduction apparatus 1-1 of FIG. 1, output signals as HD signals of the HD signal inputting section 12 and the HD main line image decompression section 30 are set as input signals as HD signals to the down conversion section 19. However, in the optical disk recording and reproduction apparatus 1-3 of FIG. 11, not only output signals as HD signals of the HD signal inputting section 12 and the HD main line image decompression section 30 but also an HD signal from between output signals of the Proxy image decompression section 202, more particularly an HD signal outputted from the Proxy/HD image size conversion section 224 described hereinabove with reference to FIG. 10, are set as input signals to the down conversion section 19.

Further, in the optical disk recording and reproduction apparatus 1-1 of FIG. 1, the changeover section 31 is set as the output destination of the up conversion section 35. However, in the optical disk recording and reproduction apparatus 1-3 of FIG. 11, the changeover section 203 is set as the output destination of the up conversion section 35. Further, in the optical disk recording and reproduction apparatus 1-1 of FIG. 1, an output signal as an SD signal of the changeover section 26 is set as an input signal as an SD signal to the up conversion section 35. However, in the optical disk recording and reproduction apparatus 1-3 of FIG. 11, an SD signal from between the output signals of the Proxy image decompression section 202, more particularly an SD signal outputted from the Proxy/SD image size conversion section 223 described hereinabove with reference to FIG. 10, is set as an input signal to the up conversion section 35 in addition to the output signal as an SD signal of the changeover section 26.

Further, in the optical disk recording and reproduction apparatus 1-1 of FIG. 1, the down conversion section 19 side, Proxy image decompression section 34 side and SD main line image decompression section 25 side are set as inputs to the changeover section 26. However, in the optical disk recording and reproduction apparatus 1-3 of FIG. 11, the down conversion section 19 side, Proxy image decompression section 202 side and SD main line image decompression section 25 side are set as inputs to the changeover section 26.

The changeover section 203 changes over the input thereof among the HD main line image decompression section 30 side, up conversion section 35 side and Proxy image decompression section 202 side, more accurately the Proxy/HD image size conversion section 224 side described hereinabove with reference to FIG. 10, under the control of the control section or the like not shown.

More particularly, where the input of the changeover section 203 is changed over to the HD main line image decompression section 30 side, an HD signal outputted from the HD main line image decompression section 30, that is, an HD signal converted from an HD main line image signal, is inputted to the changeover section 203 and provided to the HD signal outputting section 32.

Where the input of the changeover section 203 is changed ever to the up conversion section 35 side, an HD signal outputted from the up conversion section 35, that is, an HD signal obtained by an up conversion process performed for an SD signal, is inputted to the changeover section 203 and provided to the HD signal outputting section 32.

Where the input of the changeover section 203 is changed over to the Proxy image decompression section 202 side, an HD signal outputted from the Proxy image decompression section 202 is inputted to the changeover section 203 and provided to the HD signal outputting section 32. The HD signal here more particularly is that outputted from the Proxy/HD image size conversion section 224 described hereinabove with reference to FIG. 10, that is, an HD signal converted from an HD Proxy signal.

The differences in configuration of the optical disk recording and reproduction apparatus 1-3 shown in FIG. 11 from the optical disk recording and reproduction apparatus 1-1 shown in FIG. 1 are such as described above. In other words, the other portion of the configuration of the optical disk recording and reproduction apparatus 1-3 of FIG. 11 is similar in configuration to the corresponding portion of the optical disk recording and reproduction apparatus 1-1 shown in FIG. 1.

Now, an example of a recording process of the optical disk recording and reproduction apparatus 1-3 having the configuration described above with reference to FIG. 11 is described with reference to a flow chart of FIG. 12.

The recording process is started when an HD signal or an SD signal is inputted from the outside.

At step S41, the optical disk recording and reproduction apparatus 1-3 decides whether or not an SD signal is inputted thereto.

If an SD signal is inputted to the SD signal inputting section 15 through the terminal 14, then a decision of YES is made at step S41, and the SD signal is provided to the SD main line image compression section 16 and also to the Proxy image compression section 201. Then, the processing advances to step S42.

At step S42, the SD main line image compression section 16 produces an SD main line image signal from the SD signal.

At step S43, the Proxy image compression section 201 produces an SD Proxy signal from the SD signal.

Figure 12:
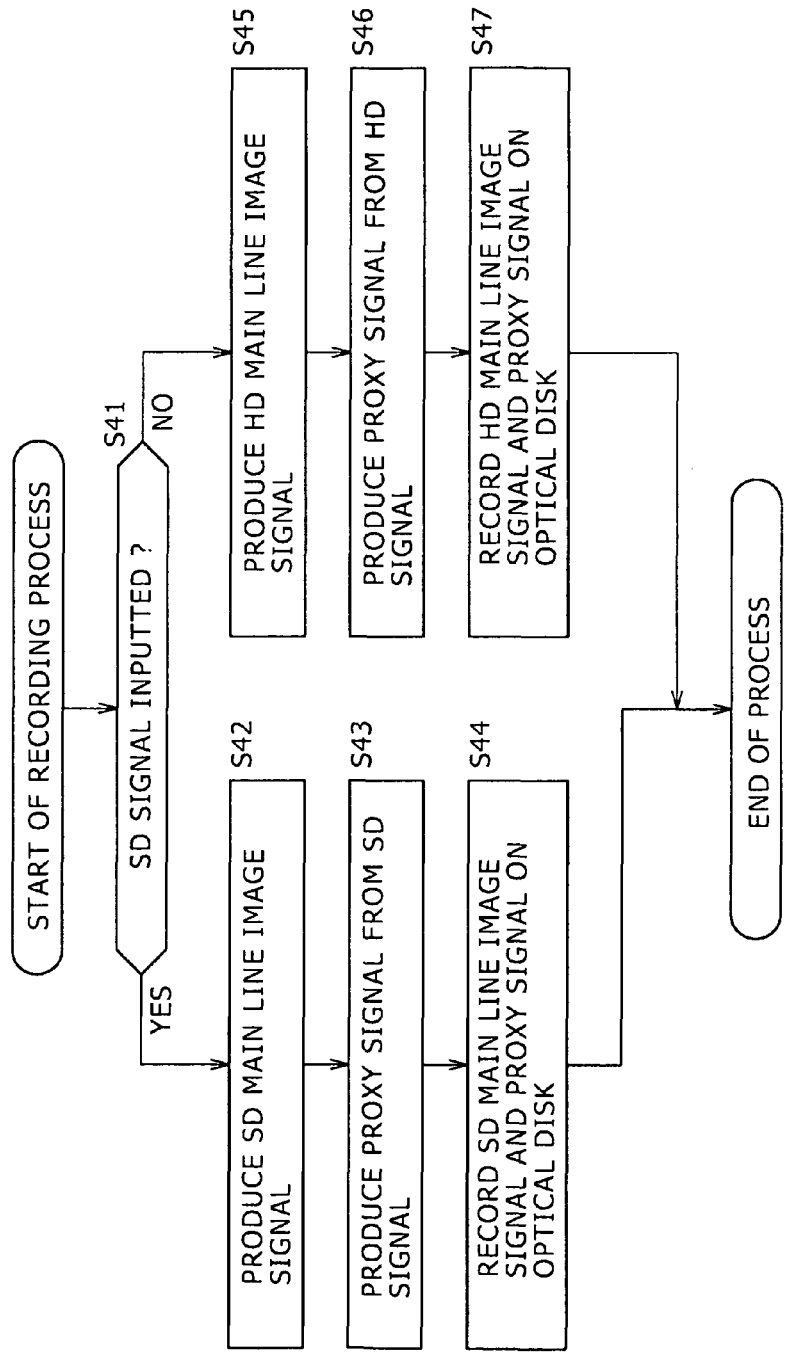
FIG. 12 is a flow chart illustrating an example of a recording process of the optical disk recording and reproduction apparatus of FIG. 11.

It is to be noted that, while it is illustrated in FIG. 12 that the process at step S43 is executed after the process at step S42 is executed for the convenience of illustration, the process at step S43 may otherwise be executed independently during execution of the process at step S42. In other words, the production process of an SD Proxy signal may be executed during, before or after the production process of a corresponding SD main line image signal.

After the SD main line image signal produced by the process at step S42 and the SD Proxy signal produced by the process at step S43 are provided to the optical disk recording/reproduction section 18, the processing advances to step S44.

At step S44, the optical disk recording/reproduction section 18 records the SD main line image signal and the SD Proxy signal on the optical disk 51. The recording process is completed therewith.

It is to be noted that it is illustrated in the flow of FIG. 12 that the process at step S44 is executed after both of the processes at steps S42 and S43 come to an end for the convenience of illustration. However, the SD main line image signal produced by the process at step S42 or the SD Proxy signal produced by the process at step S43 may be recorded on the optical disk 51 immediately after the process at step S42 or S43 is completed irrespective of at which stage the other process is.

In this manner, in the optical disk recording and reproduction apparatus 1-3 of FIG. 11, if an SD signal is inputted, then a decision of YES is made by the process at step S41, and the processes at steps S42 to S44 are executed. As a result, an SD main line image signal and an SD Proxy signal corresponding to the SD signal are recorded on the optical disk 51.

On the other hand, if an HD signal is inputted, then a decision of NO is made by the process at step S41, and the following processes at steps S45 to S47 are executed. As a result, an HD main line image signal and an HD Proxy signal corresponding to the HD signal are recorded on the optical disk 51.

In particular, if an HD signal is inputted to the HD signal inputting section 12 through the terminal 11, then a decision of NO is made at step S41, and the HD signal is provided to the HD main line image compression section 13 and also to the Proxy image compression section 201. Then, the processing advances to step S45.

At step S45, the HD main line image compression section 13 produces an HD main line image signal from the HD signal.

At step S46, the Proxy image compression section 201 produces an HD Proxy signal from the HD signal.

It is to be noted that, while it is illustrated in FIG. 12 that the process at step S46 is executed after the process at step S45 is executed for the convenience of illustration, the process at step S46 may otherwise be executed independently during execution of the process at step S45. In other words, the production process of an HD Proxy signal may be executed during, before or after the production process of a corresponding HD main line image signal.

After the HD main line image signal produced by the process at step S45 and the HD Proxy signal produced by the process at step S46 are provided to the optical disk recording/reproduction section 18, the processing advances to step S47.

At step S47, the optical disk recording/reproduction section 18 records the HD main line image signal and the HD Proxy signal on the optical disk 51. The recording process is completed therewith.

It is to be noted that, while it is illustrated in the flow of FIG. 12 that the process at step S47 is executed after both of the processes at steps S45 and S46 come to an end for the convenience of illustration, the HD main line image signal produced by the process at step S45 or the HD Proxy signal produced by the process at step S46 may be recorded on the optical disk 51 immediately after the process at step S45 or S46 is completed irrespective of at which stage the other process is.

Further, the optical disk recording and reproduction apparatus 1-3 of FIG. 11 can execute also a Proxy signal reproduction process. It is to be noted, however, that the Proxy signal reproduction process is hereinafter described as a Proxy signal reproduction process of an optical disk reproduction apparatus 111-3 of FIG. 21 with reference to a flow chart of FIG. 22. The optical disk reproduction apparatus 111-3 is a modification to and has the reproduction function of the optical disk recording and reproduction apparatus 1-3 of FIG. 11.

Figure 13:
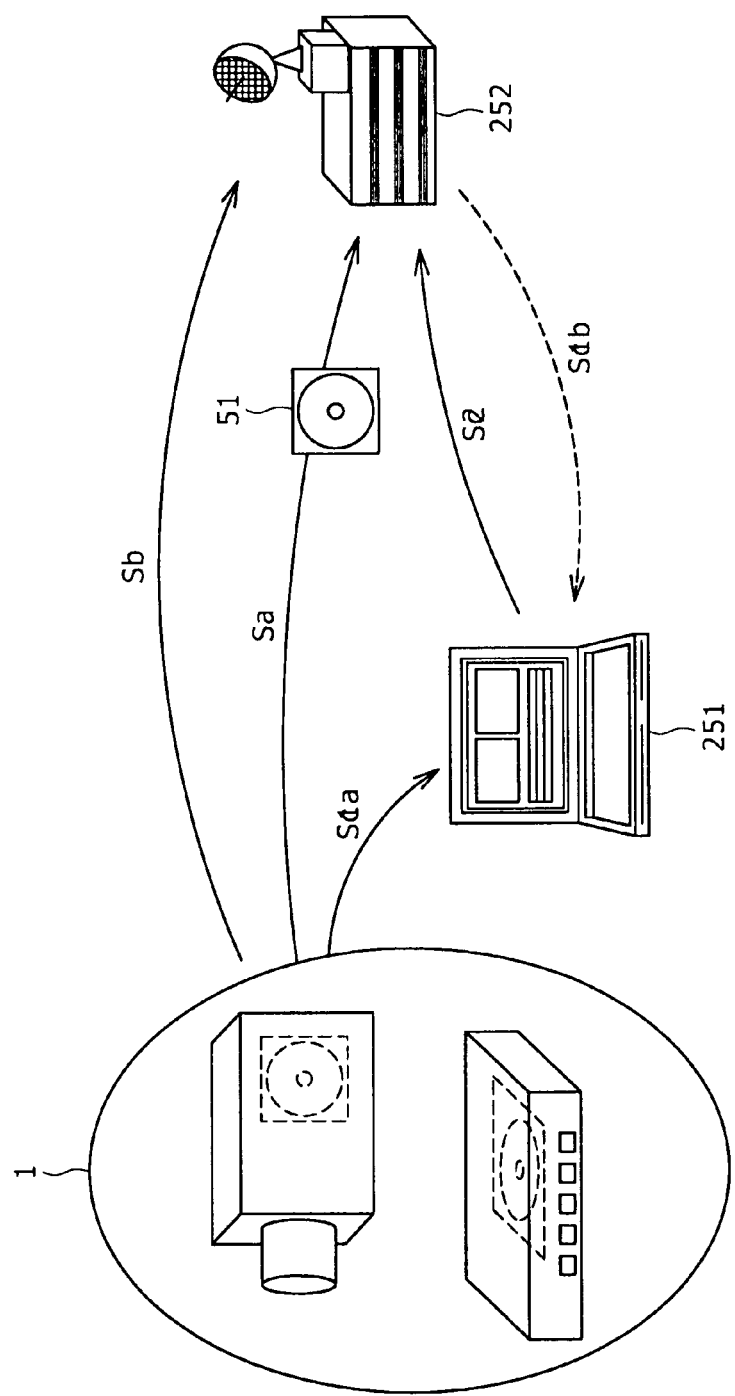
FIG. 13 is a schematic view showing an example of a configuration and action of an information processing system including the optical disk recording and reproduction apparatus of FIG. 1, 5 or 11.

An example of a configuration of an information processing system wherein an optical disk recording and reproduction apparatus 1 is applied as an apparatus for recording and/or reproducing or transmitting part of a broadcasting program as a content broadcast from a broadcasting station is shown in FIG. 13. It is to be noted that the optical disk recording and reproduction apparatus 1 mentioned is any of the optical disk recording and reproduction apparatus 1-1 of FIG. 1, optical disk recording and reproduction apparatus 1-2 of FIG. 5 and optical disk recording and reproduction apparatus 1-3 of FIG. 11 described hereinabove where they need not be distinguished from one another. Thus, FIG. 13 shows an example of a configuration of an information processing system which includes the optical disk recording and reproduction apparatus 1 to which the present invention is applied.

Referring to FIG. 13, the information processing system shown includes an optical disk recording and reproduction apparatus 1, an editing apparatus 251, and a broadcasting station 252. The broadcasting station 252 actually is a system which includes a plurality of information processing apparatus and other various apparatus installed in a broadcasting station.

In the optical disk recording and reproduction apparatus system shown in FIG. 13, the optical disk recording and reproduction apparatus 1 is implemented as an apparatus of the camcorder type or the deck type.

An outline of action or processing of the optical disk recording and reproduction apparatus system is described below.

It is assumed here that the optical disk recording and reproduction apparatus 1 exists at a remote place from the broadcasting station 252 such as a news source. Meanwhile, the editing apparatus 251 can exist at an arbitrary place independent of the optical disk recording and reproduction apparatus 1 and may exist, for example, in the broadcasting station 252. However, it is assumed here that the editing apparatus 251 exists around the optical disk recording and reproduction apparatus 1.

In this instance, the present optical disk recording and reproduction apparatus system can execute processes, for example, at steps Sa to Sc illustrated in FIG. 13. It is to be noted that the process at step Sc includes processes Sc1a or Sc1b and Sc2.

The process at step Sa is such as follows. In particular, the optical disk recording and reproduction apparatus 1 records a content of an object of transmission to the broadcasting station 252 in two forms of an SD main line image signal or an HD main line image signal and a Proxy signal on the optical disk 51. It is to be noted that, in the following description, where there is no necessity to distinguish the SD main line image signal and the HD main line image signal from each other, they are collectively referred to as main line image signals. The optical disk 51 having signals recorded thereon in such a manner as described is delivered to the broadcasting station 252 by a human being or the like, for example, by a home delivery service. By the delivery, the main line image signal and the Proxy image signal are transmitted from the optical disk recording and reproduction apparatus 1 to the broadcasting station 252 through the optical disk 51. The process at step Sa includes such a series of processes as described above.

However, since the optical disk recording and reproduction apparatus 1 here exists at a remote place from the broadcasting station 252, the process at step Sa requires a long period of time. In other words, a long period of time is required until a content recorded on the optical disk 51 arrives in the form of a main line image signal or a Proxy signal at the broadcasting station 252. This is because the period of time in which the optical disk 51 is delivered to the broadcasting station 252 by a human being or the like is long.

Therefore, a first demand to emergently broadcast a content obtained by image pickup by the optical disk recording and reproduction apparatus 1 while a news program is being broadcast within the news program, that is, to broadcast the content as an emergency image, is raised frequently. However, it is very difficult to satisfy the first demand with the process at step Sa.

Thus, if broadcasting with some low picture quality is permitted taking the peculiarity of emergency broadcasting into consideration, then the first demand can be satisfied by executing such a process at step Sb as described below.

In particular, the optical disk recording and reproduction apparatus 1 has the network connection section 22 shown in FIG. 1 and so forth incorporated therein. Thus, the optical disk recording and reproduction apparatus 1 transmits a content to the broadcasting station 252, for example, through a network. This process is the substance of the process at step Sb.

In this instance, the form of the content in transmission may be a main line image signal or a Proxy signal as described hereinabove. However, the data amount of an image size reduction type Proxy signal is smaller than that of the main line image signal and the transmission time can be reduced as much. Therefore, the image size reduction type Proxy signal is superior as the transmission form of the content.

Also a second demand to broadcast a content after edited as early as possible even if the broadcasting is not emergency broadcasting but in high picture quality, that is, in the form of a main line image signal, is raised frequently.

In this instance, a main image line signal recorded on the optical disk 51 which is delivered to the broadcasting station 252 by the process at step Sa is utilized. However, if the content is edited using the main line image signal and so forth recorded on the optical disk 51 after the optical disk 51 is delivered, then it is very difficult to satisfy the second demand, that is, to edit and broadcast the content as early as possible.

The second demand can be satisfied readily, for example, if such a process at step Sc as described below is executed.

In particular, the editing apparatus 251 is formed typically from a personal computer, and the user or editing person will operate the editing apparatus 251 to carry out a rough editing work using the Proxy signal or a work of confirming or searching for an image corresponding to the Proxy signal. In other words, the editing apparatus 251 in which a function for allowing such a work as described above is incorporated is prepared in advance by the user.

It is to be noted here that the rough editing work is a work of producing time information with which, for example, an editing point is indicated by the position on the time axis, and particularly a work of producing, for example, a time code edit list.

The type of a Proxy signal which can be handled by the editing apparatus 251 is not limited particularly to the image size reduction type Proxy signal but may be any type.

In this instance, as a process at step Sc1*a*, the optical disk recording and reproduction apparatus 1 transmits a Proxy signal to the editing apparatus 251 similarly to the process at step Sb described hereinabove. However, if the editing apparatus 251 is located around the optical disk recording and reproduction apparatus 1, then the process at step Sc1*a* may be a process of transmitting a Proxy signal to the editing apparatus 251 through the optical disk 51 similarly to the process at step Sa.

It is to be noted that the process at step Sc1*a* may be replaced by a process at step Sc1*b* at which a Proxy signal transmitted to the broadcasting station 252 by the process at step Sb described hereinabove is transmitted to the editing apparatus 251 by the broadcasting station 252.

In other words, the transmission path of a Proxy signal from the optical disk recording and reproduction apparatus 1 to the editing apparatus 251 is not limited particularly but may be any path.

The user or editing person would make use of a Proxy signal transmitted to the editing apparatus 251 through any transmission path to carry out such a rough editing work as described above and so forth.

Thereafter, as a process at step Sc2, the editing apparatus 251 transmits information representative of a result of the editing, for example, time information such as a time code edit list to the broadcasting station 252.

As a result of such a process at step Sc as just described, the result of editing such as time information arrives at the broadcasting station 252 before the optical disk 51 is delivered to the broadcasting station 252 by the process at step Sa. As a result, immediately after the optical disk 51 is delivered, the main line image signal recorded on the optical disk 51 can be broadcast making use of the result of editing such as time information. In other words, the second demand described above is satisfied.

Further, as the process at step Sc1*b*, not only the process of transmitting a Proxy signal to the editing apparatus 251 but also such a following process as described below can be executed.

In particular, usually an apparatus having functions similar to those of the editing apparatus 251 exists also in the broadcasting station 252. Therefore, some person such as a director in the broadcasting station 252 would use the apparatus to confirm or search for an image corresponding to a Proxy signal transmitted by the process at step Sb to produce an editing instruction such as, for example, an instruction or information indicating which image should be broadcast. Then, as the process at step Sc1*b*, the instruction is transmitted to the editing apparatus 251 from the apparatus in the broadcasting station 252. Consequently, the user or editing person of the editing apparatus 251 can easily perform editing in accordance with the intention or instruction of the person such as a director in the broadcasting station 252.

It is to be noted here that, although the foregoing description is given without making a distinction between an SD signal and an HD signal for the simplification of description, since both of an SD Proxy signal and an HD Proxy signal have the same format, the processes at steps Sa to Sc described hereinabove can be executed commonly to both of an SD signal and an HD signal. In other words, the information processing system shown in FIG. 13 can be utilized commonly for both of an SD signal and an HD signal.

Incidentally, the present invention can be applied not only to the optical disk recording and reproduction apparatus 1 described hereinabove but also to various apparatus. For example, the present invention can be applied also to an optical disk recording apparatus for recording only and an optical disk reproduction apparatus for reproduction only.

In particular, for example, various apparatus to which the present invention is applied are shown in FIGS. 14 to 23.

Figure 14:
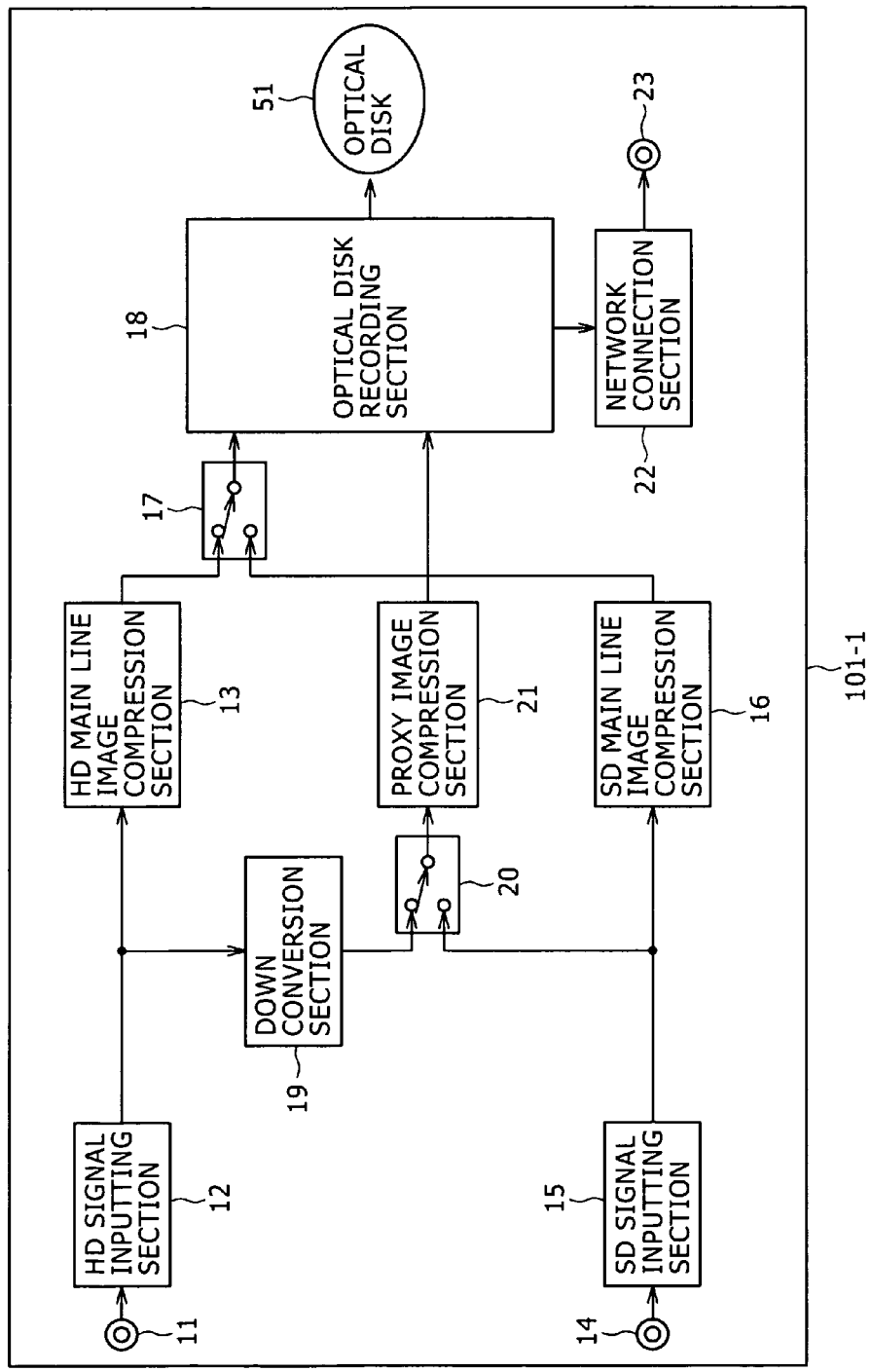
FIG. 14 is a block diagram showing an example of a configuration of an optical disk recording apparatus to which the present invention is applied.

Referring first to FIG. 14, there is shown an optical disk recording apparatus to which the present invention is applied. The optical disk recording apparatus 101-1 includes those of the blocks of the optical disk recording and reproduction apparatus 1-1 of FIG. 1 which are provided to implement the recording function. In other words, the optical disk recording apparatus 101-1 omits those of the blocks of the optical disk recording and reproduction apparatus 1-1 of FIG. 1 which are provided to implement the reproduction function. It is to be noted that the blocks of the optical disk recording apparatus 101-1 of FIG. 14 are individually described hereinabove with reference to FIG. 1, and therefore, description of the blocks is omitted herein to avoid redundancy. Also an example of the recording process is described hereinabove with reference to the flow chart of FIG. 4, and therefore, overlapping description thereof is omitted herein to avoid redundancy.

Figure 15:
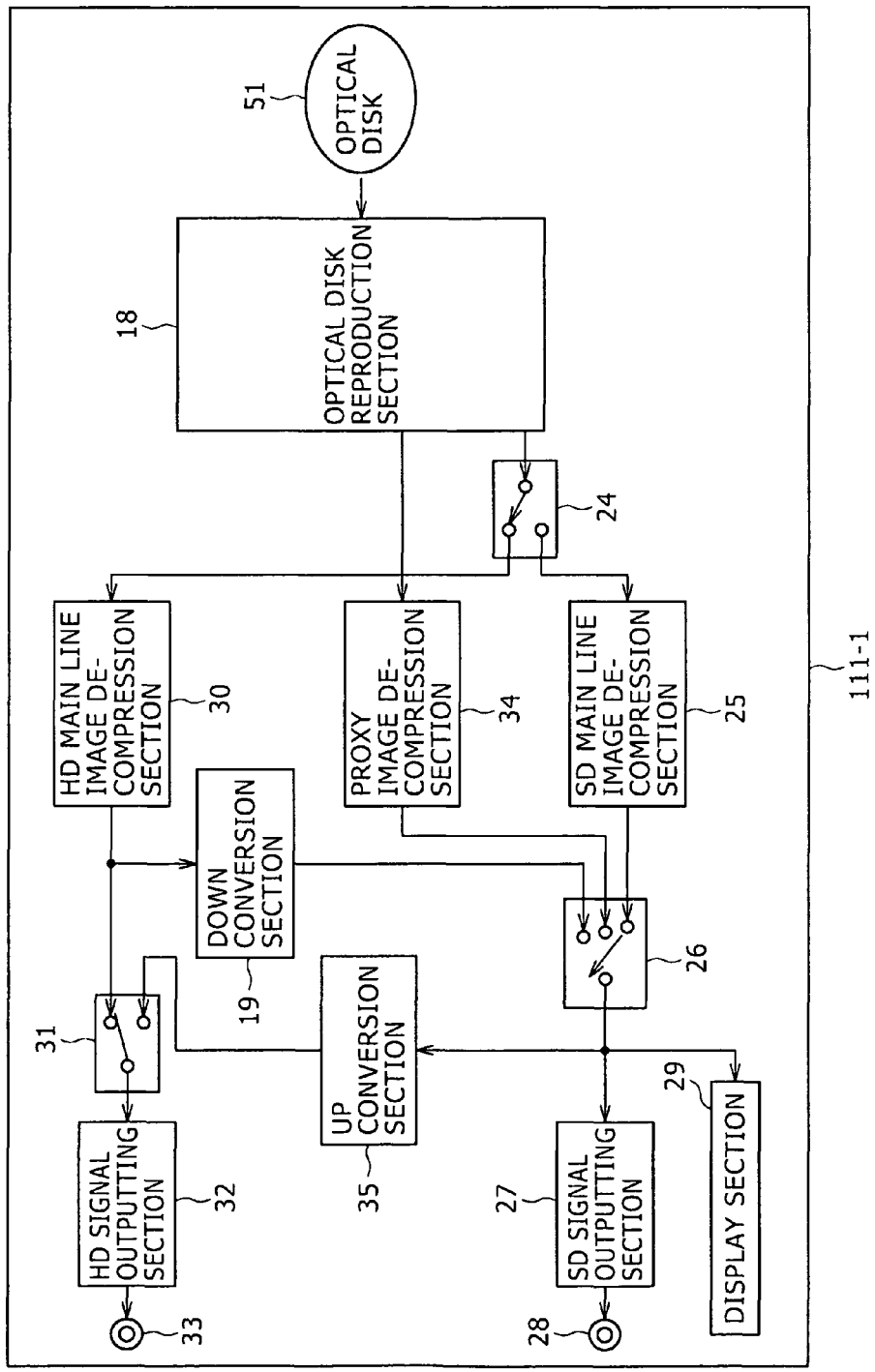
FIG. 15 is a block diagram showing an example of a configuration of an optical disk reproduction apparatus to which the present invention is applied.

FIG. 15 illustrates an optical disk reproduction apparatus 111-1 which includes those of the blocks of the optical disk recording and reproduction apparatus 1-1 of FIG. 1 which are provided to implement the reproduction function. In other words, the optical disk reproduction apparatus 111-1 omits those of the blocks of the optical disk recording and reproduction apparatus 1-1 of FIG. 1 which are provided to implement the recording function. It is to be noted that the blocks of the optical disk recording apparatus 111-1 of FIG. 15 are individually described hereinabove with reference to FIG. 1, and therefore, description of the blocks is omitted herein to avoid redundancy.

Figure 16:
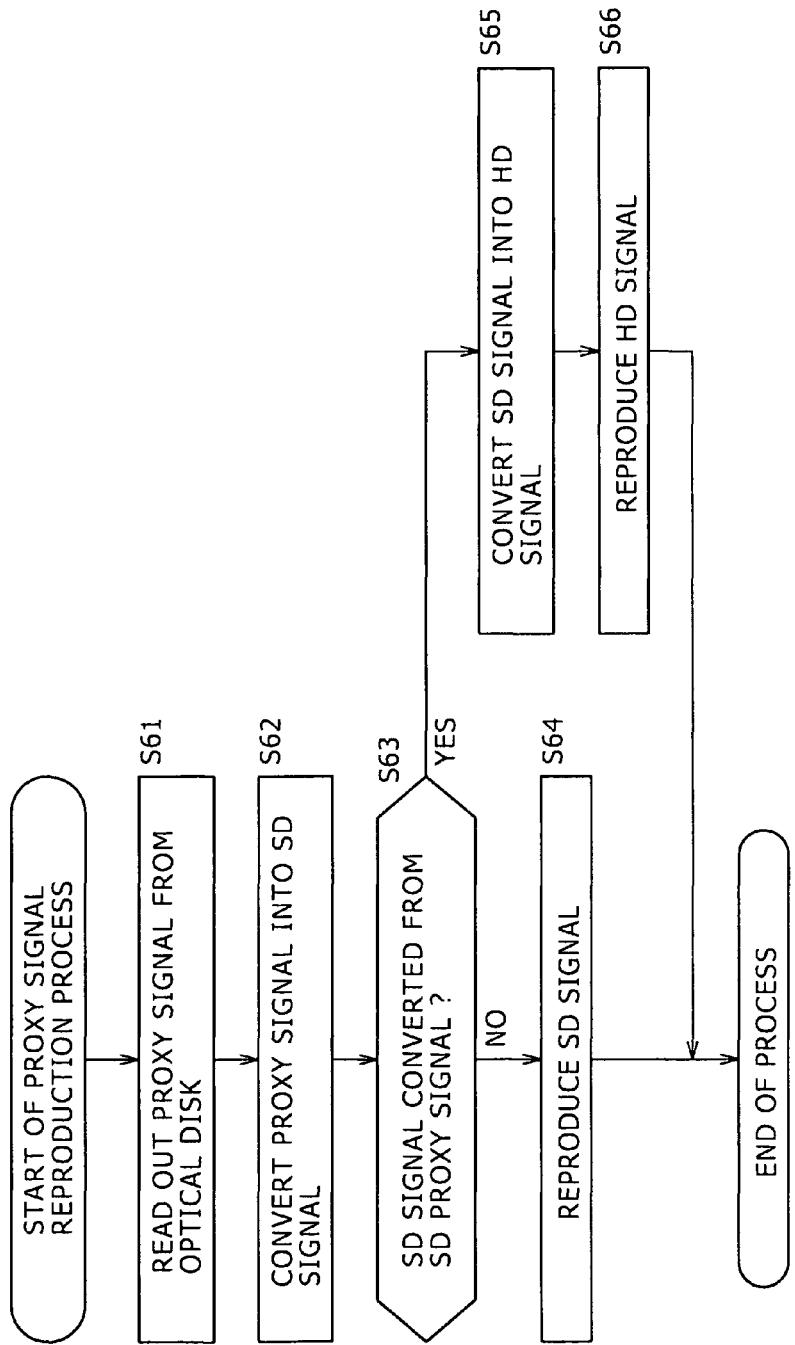
FIG. 16 is a flow chart illustrating an example of a Proxy signal reproduction process of the optical disk reproduction apparatus of FIG. 15 or the optical disk recording and reproduction apparatus of FIG. 1.

An example of a Proxy signal reproduction process executed by the optical disk reproduction apparatus 111-1 of FIG. 15 is described with reference to a flow chart of FIG. 16.

At step S61, the optical disk reproduction section 18 reads out a Proxy signal from the optical disk 51 and provides the Proxy signal to the Proxy image decompression section 34.

At step S62, the Proxy image decompression section 34 converts the Proxy signal into an SD signal and provides the SD signal to the changeover section 26.

At step S63, the optical disk reproduction apparatus 111-1, particularly a control section or the like not shown, decides whether or not the SD signal is obtained by conversion from an HD Proxy signal.

If it is decided at step S63 that the SD signal is not obtained by conversion from an HD Proxy signal, that is, if it is decided that the SD signal is obtained by conversion from an SD Proxy signal, then the processing advances to step S64.

At step S64, the SD signal outputting section 27 reproduces and outputs the SD signal provided thereto from the changeover section 26 through the terminal 28. The Proxy signal reproduction process is ended therewith.

On the other hand, if it is decided at step S63 that the SD signal is obtained by conversion from an HD Proxy signal, then the processing advances to step S65.

At step S65, the up conversion section 35 converts the SD signal provided thereto from the changeover section 26 into an HD signal and provides the HD signal to the HD signal outputting section 32 through the changeover section 31.

At step S66, the HD signal outputting section 32 reproduces and outputs the HD signal provided thereto from the changeover section 31 through the terminal 33. The Proxy signal reproduction process is ended therewith.

As described hereinabove, the optical disk reproduction apparatus 111-1 of FIG. 15 is composed of those of the blocks of the optical disk recording and reproduction apparatus 1-1 of FIG. 1 which are provided to implement the reproduction function. Accordingly, also the optical disk recording and reproduction apparatus 1-1 of FIG. 1 can naturally execute the Proxy signal reproduction process of FIG. 16.

Figure 17:
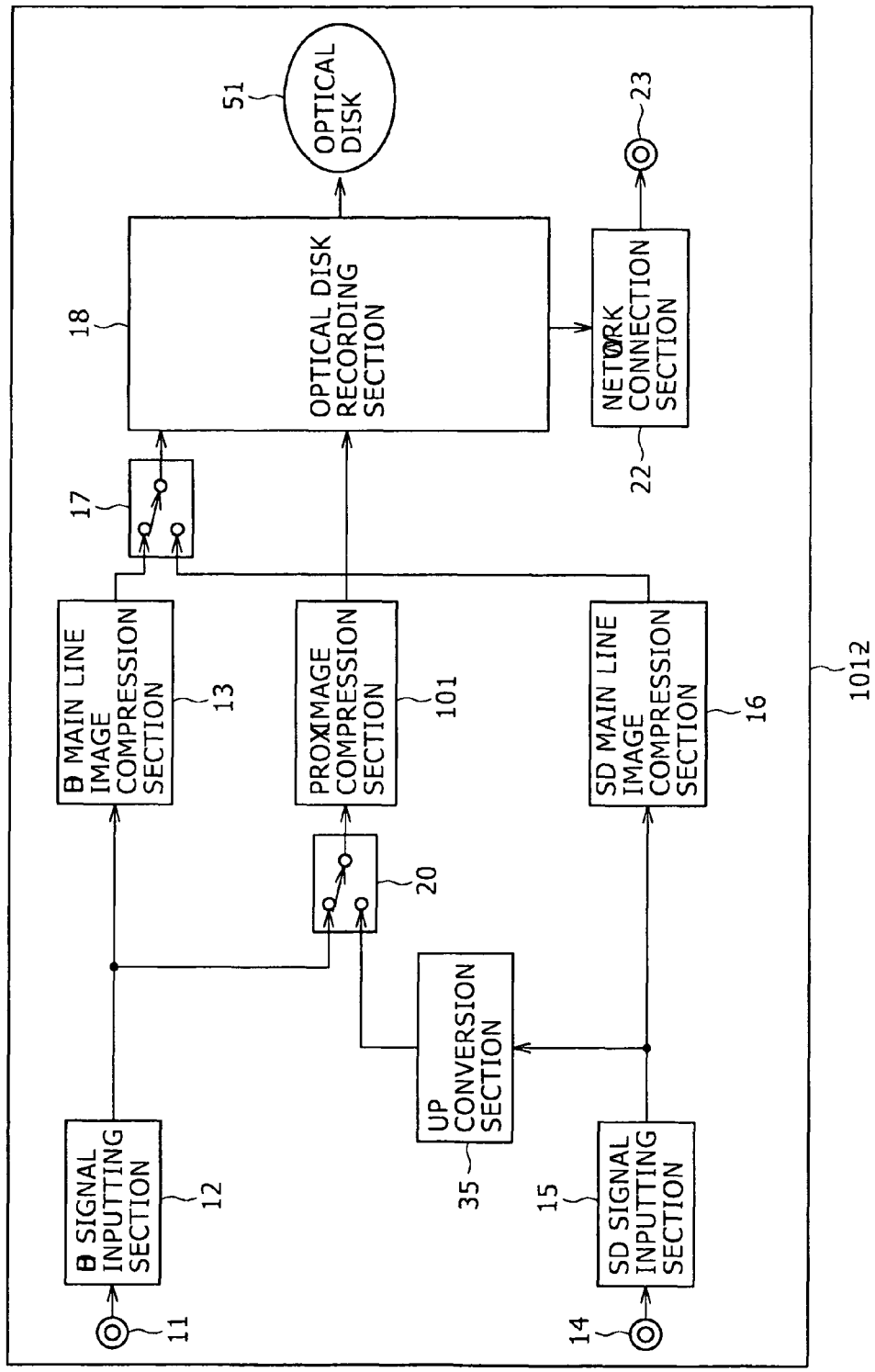
FIG. 17 is a block diagram showing another example of a configuration of an optical disk recording apparatus to which the present invention is applied.

On the other hand, an optical disk recording apparatus 101-2 shown in FIG. 17 is composed of those of the blocks of the optical disk recording and reproduction apparatus 1-2 of FIG. 5 which are provided to implement the recording function. In other words, the optical disk recording apparatus 101-2 omits those of the blocks of the optical disk recording and reproduction apparatus 1-2 of FIG. 5 which are provided to implement the reproduction function. It is to be noted that the blocks of the optical disk recording apparatus 101-2 of FIG. 17 are individually described hereinabove with reference to FIG. 5, and therefore, description of the blocks is omitted herein to avoid redundancy. Also an example of the recording process is described hereinabove with reference to the flow chart of FIG. 8, and therefore, overlapping description thereof is omitted herein to avoid redundancy.

Figure 18:
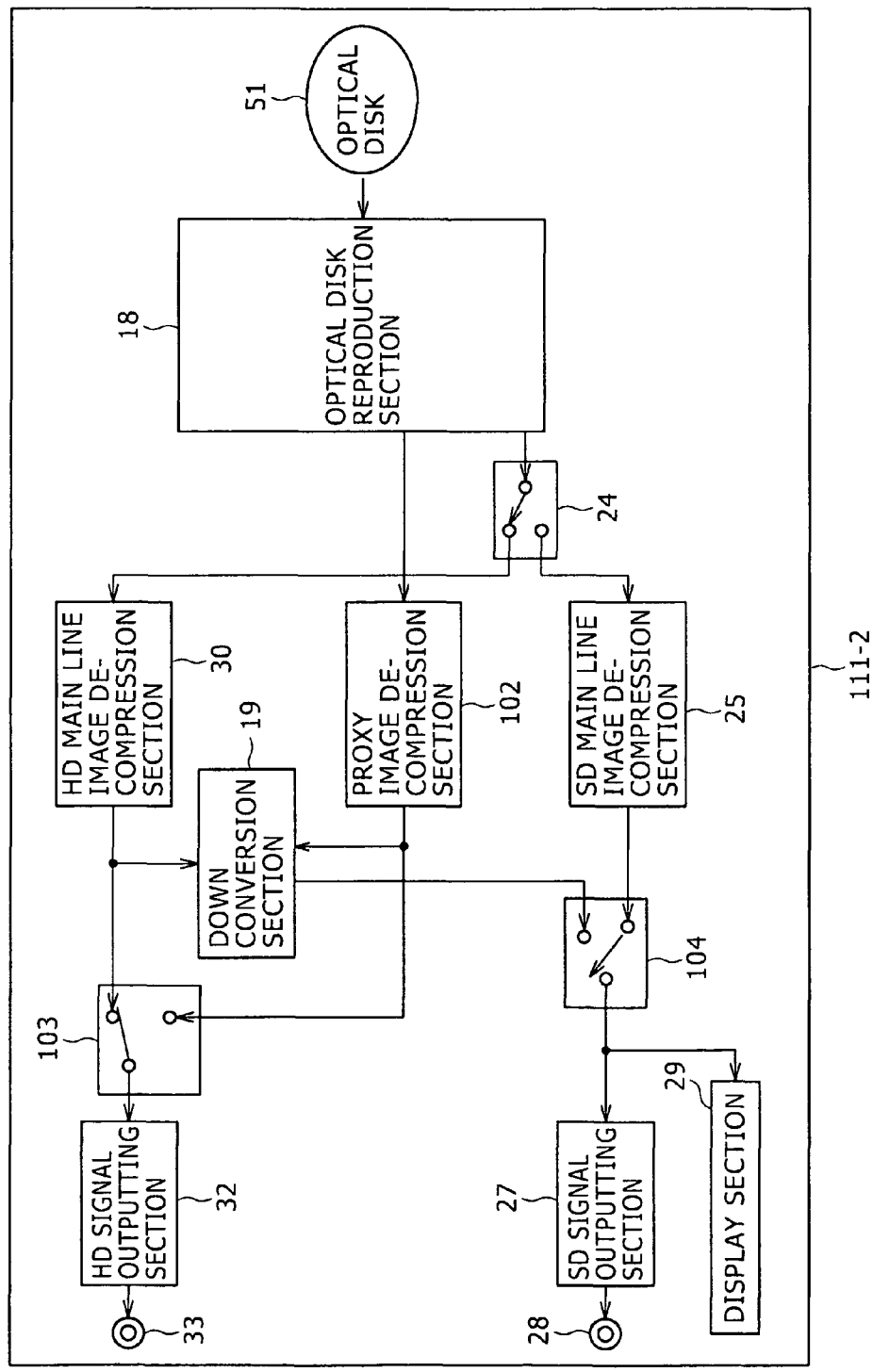
FIG. 18 is a block diagram showing another example of a configuration of an optical disk reproduction apparatus to which the present invention is applied.

In contrast, an optical disk reproduction apparatus 111-2 shown in FIG. 18 is composed of those of the blocks of the optical disk recording and reproduction apparatus 1-2 of FIG. 5 which are provided to implement the reproduction function. In other words, the optical disk reproduction apparatus 111-2 omits those of the blocks of the optical disk recording and reproduction apparatus 1-2 of FIG. 5 which are provided to implement the recording function. It is to be noted that the blocks of the optical disk reproduction apparatus 111-2 of FIG. 18 are individually described hereinabove with reference to FIG. 5, and therefore, description of the blocks is omitted herein to avoid redundancy.

Figure 19:
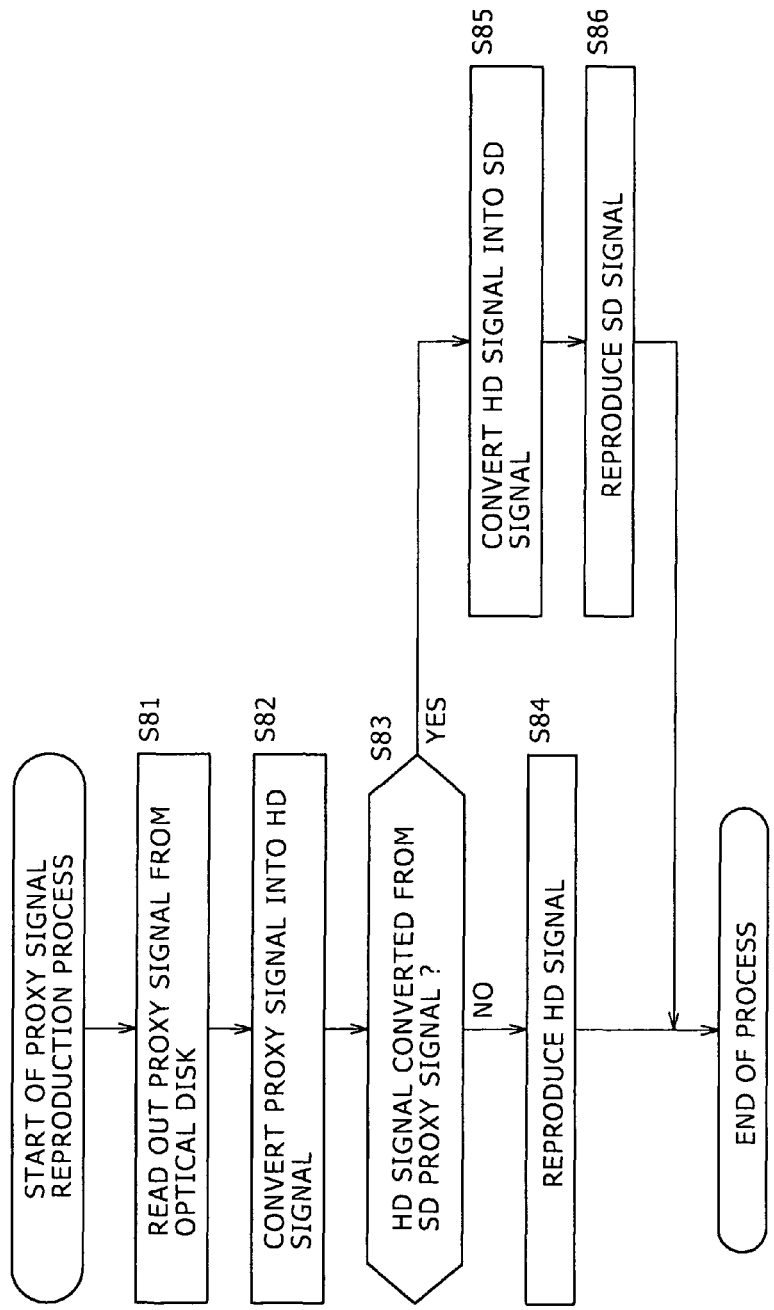
FIG. 19 is a flow chart illustrating an example of a Proxy signal reproduction process of the optical disk reproduction apparatus of FIG. 18 or the optical disk recording and reproduction apparatus of FIG. 5.

An example of a Proxy signal reproduction process executed by the optical disk reproduction apparatus 111-2 of FIG. 18 is described with reference to a flow chart of FIG. 19.

At step S81, the optical disk reproduction section 18 reads out a Proxy signal from the optical disk 51 and provides the Proxy signal to the Proxy image decompression section 102.

At step S82, the Proxy image decompression section 102 converts the Proxy signal into an HD signal and provides the HD signal to the changeover section 103 and the down conversion section 19.

At step S83, the optical disk reproduction apparatus 111-2, particularly a control section or the like not shown, decides whether or not the HD signal is obtained by conversion from an SD Proxy signal.

If it is decided at step S83 that the HD signal is not obtained by conversion from an SD Proxy signal, that is, if it is decided that the HD signal is obtained by conversion from an HD Proxy signal, then the processing advances to step S84.

At step S84, the HD signal outputting section 32 reproduces and outputs the HD signal provided thereto from the changeover section 103 through the terminal 33. The Proxy signal reproduction process is ended therewith.

On the other hand, if it is decided at step S83 that the HD signal is obtained by conversion from an SD Proxy signal, then the processing advances to step S85.

At step S85, the down conversion section 19 converts the HD signal provided thereto from the Proxy image decompression section 102 into an SD signal and provides the SD signal to the SD signal outputting section 27 through the changeover section 104.

At step S86, the SD signal outputting section 27 reproduces and outputs the SD signal provided thereto from the changeover section 104 through the terminal 28. The Proxy signal reproduction process is ended therewith.

It is to be noted that, as described hereinabove, the optical disk reproduction apparatus 111-2 of FIG. 18 is composed of those of the blocks of the optical disk recording and reproduction apparatus 1-2 of FIG. 5 which are provided to implement the reproduction function. Accordingly, also the optical disk recording and reproduction apparatus 1-2 of FIG. 5 can naturally execute the Proxy signal reproduction process of FIG. 19.

On the other hand, an optical disk recording apparatus 101-3 shown in FIG. 20 is composed of those of the blocks of the optical disk recording and reproduction apparatus 1-3 of FIG. 11 which are provided to implement the recording function. In other words, the optical disk recording apparatus 101-3 omits those of the blocks of the optical disk recording and reproduction apparatus 1-3 of FIG. 11 which are provided to implement the reproduction function. It is to be noted that the blocks of the optical disk recording apparatus 101-3 of FIG. 20 are individually described hereinabove with reference to FIG. 11, and therefore, description of the blocks is omitted herein to avoid redundancy. Also an example of the recording process is described hereinabove with reference to the flow chart of FIG. 12, and therefore, overlapping description thereof is omitted herein to avoid redundancy.

In contrast, an optical disk reproduction apparatus 111-3 shown in FIG. 21 is composed of those of the blocks of the optical disk recording and reproduction apparatus 1-3 of FIG. 11 which are provided to implement the reproduction function. In other words, the optical disk reproduction apparatus 111-3 omits those of the blocks of the optical disk recording and reproduction apparatus 1-3 of FIG. 11 which are provided to implement the recording function. It is to be noted that the blocks of the optical disk reproduction apparatus 111-3 of FIG. 21 are individually described hereinabove with reference to FIG. 11, and therefore, description of the blocks is omitted herein to avoid redundancy.

An example of a Proxy signal reproduction function executed by the optical disk reproduction apparatus 111-3 of FIG. 21 is described with reference to a flow chart of FIG. 22.

At step S101, the optical disk reproduction section 18 reads out a Proxy signal from the optical disk 51 and provides the Proxy signal to the Proxy image decompression section 202.

At step S102, the optical disk reproduction apparatus 111-3, particularly a control section or the like not shown, decides whether or not the Proxy signal read out by the process at step S101 is an SD Proxy signal.

If it is decided at step S102 that the Proxy signal is an SD Proxy signal, then the processing advances to step S103.

At step S103, the Proxy image decompression section 202, more particularly the decompression decoding section 221, changeover section 222 and Proxy/SD image size conversion section 223 of the Proxy image decompression section 202 shown in FIG. 10, convert the Proxy signal into an SD signal and provide the SD signal to the changeover section 26.

At step S104, the SD signal outputting section 27 reproduces and outputs the SD signal provided thereto from the changeover section 26 through the terminal 28. The Proxy signal reproduction process is ended therewith.

On the other hand, if it is decided at step S102 that the HD signal is not an SD Proxy signal but an HD Proxy signal, then the processing advances to step S105.

At step S105, the Proxy image decompression section 202, more particularly the decompression decoding section 221, changeover section 222 and Proxy/HD image size conversion section 224 of the Proxy image decompression section 202 shown in FIG. 10, convert the Proxy signal into an HD signal and provide the HD signal to the changeover section 203.

At step S106, the HD signal outputting section 32 reproduces and outputs the HD signal provided thereto from the changeover section 203 through the terminal 33. The Proxy signal reproduction process is ended therewith.

It is to be noted that, as described hereinabove, the optical disk reproduction apparatus 111-3 of FIG. 21 is composed of those of the blocks of the optical disk recording and reproduction apparatus 1-3 of FIG. 11 which are provided to implement the reproduction function. Accordingly, also the optical disk recording and reproduction apparatus 1-3 of FIG. 11 can naturally execute the Proxy signal reproduction process of FIG. 22.

Incidentally, while the series of processes described above can be executed by hardware, it may otherwise be executed by software. Where the series of processes is executed by software, a program which constructs the software is installed from a program recording medium into a computer incorporated in hardware for exclusive use or, for example, a personal computer for universal use which can execute various functions by installing various programs.

FIG. 23 is a block diagram showing an example of a configuration of a personal computer which executes the series of processes described hereinabove in accordance with a program. In particular, the entirety or part (for example, the system control section and so forth described hereinabove) of the optical disk recording and reproduction apparatus described hereinabove can be configured also as a personal computer of the configuration shown in FIG. 23.

Referring to FIG. 23, a Central Processing Unit (CPU) 301 executes various processes in accordance with a program stored in a Read Only Memory (ROM) 302 or a storage section 308. A program to be executed by the CPU 301, data and so forth are suitably stored into a Random Access Memory (RAM) 303. The CPU 301, ROM 302 and RAM 303 are connected to one another by a bus 304.

Also an input/output interface 305 is connected to the CPU 301 through the bus 304. An inputting section 306 including a keyboard, a mouse, a microphone and so forth and an outputting section 307 including a display unit, a speaker and so forth are connected to the input/output interface 305. The CPU 301 executes various processes in accordance with an instruction inputted from the inputting section 306. Then, the CPU 301 outputs a result of the processes to the outputting section 307.

A storage section 308 formed from a hard disk or the like is connected to the input/output interface 305 and stores a program to be executed by the CPU 301 and various data. A communication section 309 communicates with an external apparatus connected thereto through a network such as the Internet and/or a local area network.

A program may be acquired through the communication section 309 and stored into the storage section 308.

A drive 310 is connected to the input/output interface 305. When a removable medium 311 such as a magnetic disk, an optical disk, a magneto-optical disk, a semiconductor memory or the like is suitably loaded into the drive 310, the drive 310 drives the removable medium 311. Thereupon, the drive 310 acquires a program, data and so forth recorded on the removable medium 311. The acquired program or data are transferred to and stored into the storage section 308 as occasion demands.

Further, when the removable medium 311 is loaded into the drive 310, the drive 310 may drive the removable medium 311 and record data and so forth on the removable medium 311.

The program recording medium on which a program to be installed into a computer and placed into an executable condition by the computer is recorded may be, for example, as shown in FIG. 23, a removable medium 311 in the form of a package medium formed from a magnetic disk (including a floppy disk), an optical disk (including a CD-ROM (Compact Disc-Read Only Memory) and a DVD (Digital Versatile Disc)), a magneto-optical disk, or a semiconductor memory. Else, the program recording medium may be formed as the ROM 302, a hard disk included in the storage section 308 or the like in which the program is recorded temporarily or permanently. Storage of the program into the program recording medium is performed, as occasion demands, through the communication section 209 which is an interface such as a router and a modem, making use of a wired or wireless communication medium such as a local area network, the Internet or a digital satellite broadcast.

Further, while the recording designation of a content such as an HD main line image signal, an SD main line image signal, an SD Proxy signal or an HD Proxy signal is, in the examples described hereinabove, the optical disk 51 shown in FIG. 1 and so forth, it is not limited specifically to those described hereinabove. For example, the removable medium 311, the hard disk which forms the storage section 308 or the like may be used as the recording designation.

It is to be noted that, in the present specification, the steps which describe the program stored in a program recording medium may be but need not necessarily be processed in a time series in the order as described, and include processes which are executed in parallel or individually without being processed in a time series.

Further, in the present specification, the term "system" is used to represent an entire apparatus composed of a plurality of devices or apparatus.

While preferred embodiments of the present invention have been described using specific terms, such description is for illustrative purpose only, and it is to be understood that changes and variations may be made without departing from the spirit or scope of the following claims.

What is claimed is:

1. An information processing apparatus for a recording medium, comprising:
    a conversion device converts one of an SD signal according to a predetermined standard of Standard Definition Television and an HD signal according to a predetermined standard of High-Definition Television into the other one of the signals and output the resulting signal in a predetermined format,
    wherein said conversion device including:
        a down conversion device performs a down conversion process for the HD signal input thereto and outputs an SD signal obtained by the down conversion process;
        an image size variation device performs an image size variation process for the input SD signal or the SD signal output from said down conversion device and outputs an image size variation signal obtained as a result of the image size variation process; and
        a compression encoding device performs a compression encoding process for the image size variation signal output from said image size variation device and outputs a signal obtained as a result of the compression encoding process as a signal of the predetermined format.

2. The information processing apparatus according to claim 1, said conversion device comprising:
    an up conversion device performs an up conversion process for the SD signal inputted thereto and outputs an HD signal obtained as a result of the up conversion process;
    another image size variation device performs an image size variation process for the HD signal inputted thereto or the HD signal outputted from said up conversion device and outputs an image size variation signal obtained as a result of the image size variation process; and
    a compression encoding device performs a compression encoding process for the image size variation signal outputted from said another image size variation device and outputs a signal obtained as a result of the compression encoding process as a signal of the predetermined format.

3. The information processing apparatus according to claim 1, said conversion device comprising:
    a first image size variation device performs, for the inputted SD signal of a first image size, a process for varying the image size from the first image size to a second image size and outputs an image size variation signal of the second image size obtained as a result of the process;
    a second image size variation device performs, for the inputted HD signal of a third size, a process for changing the image size from the third image size to the second image size and outputs an image size variation signal of the second image size obtained as a result of the process; and
    a compression encoding section device performs a compression encoding process for the image size variation signal outputted from said first or second image size variation devices and outputs a signal obtained as a result of the compression encoding process as a signal of the predetermined format.

4. An information processing method for a recording medium, comprising the step of:
    converting one of an SD signal according to a predetermined standard of Standard Definition Television and an HD signal according to a predetermined standard of High-Definition Television into the other one of the signals and output the resulting signal in a predetermined format, wherein said conversion step including:
        performing a down conversion process for the HD signal input thereto and outputting an SD signal obtained by the down conversion process;
        performing an image size variation process for the input SD signal or the SD signal output from said down conversion process and output an image size variation signal obtained as a result of the image size variation process; and
        performing a compression encoding process for the image size variation signal output from said image size variation process and outputting a signal obtained as a result of the compression encoding process as a signal of the predetermined format.

5. A program embodied on a non-transitory recording medium for causing a computer to execute a process which comprises the step of:
    converting one of an SD signal according to a predetermined standard of Standard Definition Television and an HD signal according to a predetermined standard of High-Definition Television into the other one of the signals and output the resulting signal in a predetermined format, wherein said conversion step including:

performing a down conversion process for the HD signal input thereto and outputting an SD signal obtained by the down conversion process;

performing an image size variation process for the input SD signal or the SD signal output from said down conversion process and outputting an image size variation signal obtained as a result of the image size variation process; and performing a compression encoding process for the image size variation signal output from said image size variation process and outputting a signal obtained as a result of the compression encoding process as a signal of the predetermined format.

6. An information processing apparatus for a recording medium, comprising:

an inverse conversion circuit inversely converts, when a signal of a predetermined format obtained by conversion from one of an SD signal according to a predetermined standard of Standard Definition Television and an HD signal according to a predetermined standard of High-Definition Television into the other one of the signals is inputted, the signal of the predetermined format into the one of the SD signal and the HD signal, wherein the signal of the predetermined format is a signal obtained by performing, for the SD signal of a first image size or an SD signal of the first image size obtained by a down conversion process performed for the HD signal, a process for varying the image size from the first image size to a second image size and then performing a compression encoding process for an image size variation signal of the second image size obtained by the variation process, said inverse conversion circuit including:
  a decompression decoding circuit performs a decompression decoding process for the signal of the predetermined format and outputs the image size variation signal obtained as a result of the decompression decoding process;
  an image size inverse conversion circuit performs a process for inversely varying the image size of the image size variation signal output from said decompression decoding circuit from the second image size to the first image size and outputs an SD signal obtained as a result of the process; and
  an up conversion circuit performs, where the SD signal output from said image size inverse conversion circuit corresponds to the SD signal obtained as a result of the down conversion process performed for the HD signal, an up conversion process for the SD signal output from said image size inverse conversion circuit and outputs an HD signal obtained as a result of the up conversion process.

7. The information processing apparatus according to claim 6, wherein the signal of the predetermined format is a signal obtained by performing, for the HD signal of a first image size or an HD signal of the first image size obtained by an up conversion process performed for the SD signal, a process for varying the image size from the first image size to a second image size and then performing a compression encoding process for an image size variation signal of the second image size obtained as a result of the variation process, said inverse conversion circuit comprising:
  a decompression decoding circuit performs a decompression decoding process for the signal of the predetermined format and outputs the image size variation signal obtained as a result of the decompression decoding process;
  another image size inverse conversion circuit performs, for the image size variation signal outputted from said decompression decoding circuit, a process for inversely varying the image size from the second image size to the first image size and outputs an HD signal obtained as a result of the process; and
  a down conversion circuit performs, where the HD signal outputted from said other image size inverse conversion circuit corresponds to the HD signal obtained by the up conversion process performed for the SD signal, a down conversion process for the HD signal outputted from said image size inverse conversion circuit and outputs an SD signal obtained as a result of the down conversion process.

8. The information processing apparatus according to claim 6, wherein the signal of the predetermined format is a signal obtained by performing a compression encoding process for an image size variation signal of a second image size obtained by performing, for the SD signal of the first image size, a process for varying the image size from the first image size to the second image size or another image size variation signal of the second image size obtained by performing, for the HD signal of a third image size, a process for varying the image size from the third image size to the second image size, said inverse conversion circuit comprising:
  a decompression decoding circuit performs a decompression decoding process for the signal of the predetermined format and outputs the image size variation signal obtained as a result of the decompression decoding process;
  a first image size inverse variation circuit performs, where the image size variation signal outputted from said decompression decoding circuit corresponds to the image size variation signal obtained by the variation from the SD signal, a process for inversely varying the image size from the second image size to the first image size for the image size variation signal outputted from said decompression decoding circuit and outputs an SD signal obtained as a result of the process; and
  a second image size inverse variation circuit performs, where the image size variation signal outputted from said decompression decoding circuit corresponds to the image size variation signal obtained by the variation from the HD signal, a process for inversely varying the image size from the second image size to the third image size for the image size variation signal outputted from said decompression decoding circuit and outputs an HD signal obtained as a result of the process.

9. An information processing method for a recording medium, comprising the step of:

inversely converting, when a signal of a predetermined format obtained by conversion from one of an SD signal according to a predetermined standard of Standard Definition Television and an HD signal according to a predetermined standard of High-Definition Television into the other one of the signals is inputted, the signal of the predetermined format into the one of the SD signal and the HD signal, wherein the signal of the predetermined format is a signal obtained by performing, for the SD signal of a first image size or an SD signal of the first image size obtained by a down conversion process performed for the HD signal, a process for varying the image size from the first image size to a second image size and then performing a compression encoding process for an image size variation signal of the second image size obtained by the variation process, said inverse conversion step including:

performing a decompression decoding process for the signal of the predetermined format and outputting the image size variation signal obtained as a result of the decompression decoding process;

performing a process for inversely varying the image size of the image size variation signal output from said decompression decoding process from the second image size to the first image size and outputting an SD signal obtained as a result of the process; and performing, where the SD signal output from said image size inverse conversion process corresponds to the SD signal obtained as a result of the down conversion process performed for the HD signal, an up conversion process for the SD signal output from said image size inverse conversion process and outputting an HD signal obtained as a result of the up conversion process.

10. A program embodied on a non-transitory recording medium for causing a computer to execute a process which comprises the step of:

inversely converting, when a signal of a predetermined format obtained by conversion from one of an SD signal according to a predetermined standard of Standard Definition Television and an HD signal according to a predetermined standard of High-Definition Television into the other one of the signals is inputted, the signal of the predetermined format into the one of the SD signal and the HD signal, wherein the signal of the predetermined format is a signal obtained by performing, for the SD signal of a first image size or an SD signal of the first image size obtained by a down conversion process performed for the HD signal, a process for varying the image size from the first image size to a second image size and then performing a compression encoding process for an image size variation signal of the second image size obtained by the variation process, said inverse conversion step including:

performing a decompression decoding process for the signal of the predetermined format and outputting the image size variation signal obtained as a result of the decompression decoding process;

performing a process for inversely varying the image size of the image size variation signal outputted from said decompression decoding process from the second image size to the first image size and outputting an SD signal obtained as a result of the process; and performing, where the SD signal output from said image size inverse conversion process corresponds to the SD signal obtained as a result of the down conversion process performed for the HD signal, an up conversion process for the SD signal output from said image size inverse conversion process and outputting an HD signal obtained as a result of the up conversion process.

11. A transmission apparatus for transmitting a signal, comprising:

a conversion hardware converts one of an SD signal according to a predetermined standard of Standard Definition Television and an HD signal according to a predetermined standard of High-Definition Television into the other one of the signals and output the resulting signal in a predetermined format; and a transmission hardware transmits the signal of the predetermined format outputted from said conversion hardware, wherein said conversion hardware including:

a down conversion hardware performs a down conversion process for the HD signal input thereto and outputs an SD signal obtained by the down conversion process;

an image size variation hardware performs an image size variation process for the input SD signal or the SD signal output from said down conversion hardware and outputs an image size variation signal obtained as a result of the image size variation process; and a compression encoding hardware performs a compression encoding process for the image size variation signal output from said image size variation hardware and output a signal obtained as a result of the compression encoding process as a signal of the predetermined format.

12. A transmission method for a transmission apparatus for transmitting a signal, comprising the steps of:

converting one of an SD signal according to a predetermined standard of Standard Definition Television and an HD signal according to a predetermined format of High-Definition Television into the other one of the signals in a predetermined format; and controlling transmission of the signal of the predetermined format from said transmission apparatus, wherein said conversion step including:

performing a down conversion process for the HD signal input thereto and output an SD signal obtained by the down conversion process;

performing an image size variation process for the input SD signal or the SD signal output from said down conversion process and outputting an image size variation signal obtained as a result of the image size variation process; and performing a compression encoding process for the image size variation signal output from said image size variation process and outputting a signal obtained as a result of the compression encoding process as a signal of the predetermined format.

13. A program embodied on a non-transitory recording medium for causing a computer, which controls an apparatus for transmitting a signal, to execute a process which comprising the steps of:

converting one of an SD signal according to a predetermined standard of Standard Definition Television and an HD signal according to a predetermined format of High-Definition Television into the other one of the signals in a predetermined format; and transmitting the signal of the predetermined format from said transmission apparatus, wherein said conversion step including:

performing a down conversion process for the HD signal input thereto and outputting an SD signal obtained by the down conversion process;

performing an image size variation process for the input SD signal or the SD signal output from said down conversion process and outputting an image size variation signal obtained as a result of the image size variation process; and performing a compression encoding process for the image size variation signal output from said image size variation process and outputting a signal obtained as a result of the compression encoding process as a signal of the predetermined format.

14. A recording apparatus, comprising:
a conversion circuit configured to convert one of an SD signal according to a predetermined standard of Standard Definition Television and an HD signal according to a predetermined standard of High-Definition Television into a signal of a predetermined format and output the signal of the predetermined format; and
a recording control circuit configured to perform a control process to record the signal of the predetermined format outputted from said conversion circuit on a predetermined recording medium,
wherein said conversion circuit including:
a down conversion circuit configured to perform a down conversion process for the HD signal input thereto and output an SD signal obtained by the down conversion process;
an image size variation circuit configured to perform an image size variation process for the input SD signal or the SD signal output from said down conversion circuit and output an image size variation signal obtained as a result of the image size variation process; and
a compression encoding circuit configured to perform a compression encoding process for the image size variation signal output from said image size variation circuit and output a signal obtained as a result of the compression encoding process as a signal of the predetermined format.

15. A recording apparatus according to claim 14, further comprising:
an SD compression encoding circuit configured to perform a compression encoding process for the SD signal and output a compression encoded SD signal obtained as a result of the compression encoding process; and
wherein said recording control circuit performs a control process to record the compression encoded SD signal outputted from said SD compression encoding circuit on the predetermined recording medium together with the signal of the predetermined format obtained by the conversion from the SD signal by said conversion circuit.

16. The recording apparatus according to claim 14, further comprising:
an HD compression encoding circuit configured to perform a compression encoding process for the HD signal and output the compression encoded HD signal obtained as a result of the compression encoding process; and
wherein said recording controlling circuit performs a control process to record the compression encoded HD signal outputted from said HD compression encoding circuit on the predetermined recording medium together with the signal of the predetermined format obtained by the conversion from the HD signal by said conversion circuit.

17. A recording method for a recording apparatus for recording a signal on a predetermined recording medium, comprising the steps of:
converting one of an SD signal according to a predetermined standard of Standard Definition Television and an HD signal according to a predetermined standard of High-Definition Television into a signal of a predetermined format; and
performing a control process to record the signal of the predetermined format on the predetermined recording medium,
wherein said conversion step including:
performing a down conversion process for the HD signal input thereto and outputting an SD signal obtained by the down conversion process;
performing an image size variation process for the input SD signal or the SD signal output from said down conversion process and outputting an image size variation signal obtained as a result of the image size variation process; and
performing a compression encoding process for the image size variation signal output from said image size variation process and outputting a signal obtained as a result of the compression encoding process as a signal of the predetermined format.

18. A program embodied on a non-transitory recording medium for causing a computer, which controls a process of recording a signal on a predetermined recording medium, the program comprising the steps of:
converting one of an SD signal according to a predetermined standard of Standard Definition Television and an HD signal according to a predetermined standard of High-Definition Television into a signal of a predetermined format; and
performing a control process to record the signal of the predetermined format on the predetermined recording medium,
wherein said conversion step including:
performing a down conversion process for the HD signal input thereto and outputting an SD signal obtained by the down conversion process;
performing an image size variation process for the input SD signal or the SD signal output from said down conversion process and outputting an image size variation signal obtained as a result of the image size variation process; and
performing a compression encoding process for the image size variation signal output from said image size variation process and outputting a signal obtained as a result of the compression encoding process as a signal of the predetermined format.

* * * * *